(12) United States Patent
Breadmore et al.

(10) Patent No.: US 12,461,063 B2
(45) Date of Patent: Nov. 4, 2025

(54) INORGANIC ION DETECTION SYSTEM AND METHODS

(71) Applicant: University of Tasmania, Sandy Bay (AU)

(72) Inventors: Michael Charles Breadmore, Sandy Bay (AU); Philip James Charles Zakaria, Sandy Bay (AU); Gustavo Blanco-Heras, A Coruña (ES)

(73) Assignee: University of Tasmania, Tasmania (AU)

( * ) Notice: Subject to any disclaimer, the term of this patent is extended or adjusted under 35 U.S.C. 154(b) by 159 days.

(21) Appl. No.: 16/322,471

(22) PCT Filed: Aug. 15, 2017

(86) PCT No.: PCT/AU2017/050861
§ 371 (c)(1),
(2) Date: Jan. 31, 2019

(87) PCT Pub. No.: WO2018/032043
PCT Pub. Date: Feb. 22, 2018

(65) Prior Publication Data
US 2019/0353614 A1    Nov. 21, 2019

(30) Foreign Application Priority Data

Aug. 15, 2016  (AU) ............................... 2016903232
Jun. 16, 2017  (AU) ............................... 2017902304

(51) Int. Cl.
*G01N 27/447*   (2006.01)
*B01D 15/42*    (2006.01)
(Continued)

(52) U.S. Cl.
CPC ....... *G01N 27/44739* (2013.01); *B01D 15/42* (2013.01); *B01D 57/02* (2013.01);
(Continued)

(58) Field of Classification Search
CPC ......... G01N 27/447–453; G01N 27/06; G01N 1/405; G01N 2001/2833;
(Continued)

(56) References Cited

U.S. PATENT DOCUMENTS

| | | |
|---|---|---|
| 5,322,608 A | 6/1994 | Krager et al. |
| 6,402,918 B1 | 6/2002 | Schlenoff et al. |

(Continued)

FOREIGN PATENT DOCUMENTS

| | | |
|---|---|---|
| CN | 2811997 Y | 8/2006 |
| CN | 101750449 A | 6/2010 |

(Continued)

OTHER PUBLICATIONS

G. A. Blanco, et al., Identification of Inorganic Improvised Explosive Devices Using Sequential Injection Capillary Electrophoresis and Contactless Conductivity Detection, Anal. Chem., vol. 83, No. 23, pp. 9068-9075 (2011) (Year: 2011).*

(Continued)

*Primary Examiner* — Luan V Van
*Assistant Examiner* — Shizhi Qian
(74) *Attorney, Agent, or Firm* — Knobbe, Martens, Olson & Bear, LLP

(57) ABSTRACT

A system for the separation and detection of inorganic anions in a sample, the system comprising: • a separation channel with an inner coating of three or more alternating layers of a cationic polymer (e.g. hexadimethine bromide) and an anionic polymer (e.g. polystyrene sulfonate), wherein the first layer and the final layer are cationic polymer layers; • a detector for detecting inorganic anions that pass through a detection zone of the separation channel; • an injection system for injecting fluids including sample solutions and background electrolyte into an inlet end of the separation channel; wherein the background electrolyte comprises (Continued)

polyethyleneimine. Also described are corresponding methods, separation capillaries and cartridges for use in the system.

10 Claims, 29 Drawing Sheets

(51) Int. Cl.
| | |
|---|---|
| *B01D 57/02* | (2006.01) |
| *B01L 3/00* | (2006.01) |
| *G01N 1/28* | (2006.01) |
| *G01N 1/40* | (2006.01) |
| *G01N 27/06* | (2006.01) |

(52) U.S. Cl.
CPC .............. *B01L 3/502* (2013.01); *G01N 27/06* (2013.01); *G01N 27/447* (2013.01); *G01N 27/4473* (2013.01); *G01N 27/44743* (2013.01); *G01N 27/44791* (2013.01); *B01L 2300/025* (2013.01); *B01L 2300/0645* (2013.01); *B01L 2300/16* (2013.01); *G01N 2001/2833* (2013.01); *G01N 1/405* (2013.01); *G01N 2001/4061* (2013.01)

(58) Field of Classification Search
CPC ............ G01N 2001/4061; B01D 57/02; B01D 59/38–42; B01L 3/502; B01L 2300/025; B01L 2300/0645; B01L 2300/16; C07K 1/24–285

See application file for complete search history.

(56) References Cited

U.S. PATENT DOCUMENTS

| | | | |
|---|---|---|---|
| 6,841,054 B2 | 1/2005 | Schlenoff et al. | |
| 7,285,421 B2 | 10/2007 | Schlenoff et al. | |
| 7,314,550 B2 | 1/2008 | Warner et al. | |
| 7,594,986 B1 | 9/2009 | Schlenoff et al. | |
| 8,685,219 B1 | 4/2014 | Schlenoff et al. | |
| 2002/0130045 A1 | 9/2002 | Schlenoff et al. | |
| 2004/0084312 A1 | 5/2004 | Warner et al. | |
| 2015/0192544 A1* | 7/2015 | Breadmore .......... | G01N 27/453 204/550 |

FOREIGN PATENT DOCUMENTS

| | | |
|---|---|---|
| CN | 102892775 A | 1/2013 |
| CN | 104849338 A | 8/2015 |
| JP | A-H10-221305 | 8/1998 |
| JP | 2003-315310 A | 11/2003 |
| JP | 2015-524927 A | 8/2015 |
| WO | WO 2015/134925 A1 | 9/2015 |

OTHER PUBLICATIONS

L. Pei, Capillary Electrophoresis Separations of Inorganic Anions, Cations and Small Molecules (Doctoral Dissertation), Department of Chemistry, University of Alberta, 2015 (Year: 2015).*
AB SCIEX, (2015), High Resolution Separation and Quantitation of Charged and Polar Analytes, P/ACE™ MDQ Plus Capillary Electrophoresis System, [Brochure], <<http:/i.pupiq.net/a/c/c/48/48/1201343/P-ACEa_MDQ_Plus_Brochure.pdf>> last accessed Jun. 5, 2021 (Year: 2015).*
A.V. Pirogov, et al., Use of Ionenes as Capillary Modifiers in the Simultaneous Determination of Azide, Chlorate, and Perchlorate Ions by Capillary Electrophoresis, Journal of Analytical Chemistry, vol. 58, No. 8, 2003, pp. 781-784 (Year: 2003).*
T. Kishi, et al., Application of capillary electrophoresis for the determination of inorganic ions in trace explosives and explosive residues, Electrophoresis 1998, 19, 3-5 (Year: 1998).*
Alhusban, Ala A., et al. "On-line sequential injection-capillary electrophoresis for near-real-time monitoring of extracellular lactate in cell culture flasks." Journal of Chromatography A 1323 (2014): 157-162 (Year: 2014).*
Of Katayama et al., Stable cationic capillary coating with successive multiple ionic polymer layers for capillary electrophoresis, Anal. Chem., 1998, 70, 5272-5277 (Year: 1998).*
Tubaon et al., High-sensitivity analysis of anionic sulfonamides by capillary electrophoresis using synergistic stacking approach, Journal of Chromatography A., 2014, 1349, 129-134 (Year: 2014).*
Olofson, identification of peroxide explosives and traditional explosive anions by capillary electrophoresis, Master thesis of Oklahoma State University. 2009 (Year: 2009).*
Lucy, Factors affecting selectivity of inorganic anions in capillary electrophoresis, Journal of Chromatography A, 1999, 850, 319-337 (Year: 1999).*
Sarazin et al., Identification and determination of inorganic anions in real extracts from pre- and post-blast residues by capillary electrophoresis, Journal of Chromatography A, 2010, 1217, 6971-6978 (Year: 2010).*
Alhusban et al. On-line sequential injection-capillary electrophoresis for near-real-time monitoring of extracellular lactate in cell culture flasks, Journal of Chromatography A, 1323 (2014) pp. 157-162.
Blanco et al. Identification of Inorganic Improvised Explosive Devices Using Sequential Injection Capillary Electrophoresis and Contactless Conductivity Detection, Analytical Chemistry, 83 (2011) pp. 9068-9075.
Haselberg et al. Effectiveness of Charged Noncovalent Polymer Coatings against Protein Adsorption to Silica Surfaces Studied by Evanescent-Wave Cavity Ring-Down Spectroscopy and Capillary Electrophoresis, Analytical Chemistry, 81 (2009) pp. 10172-10178.
Nehme et al. Stability of capillaries coated with highly charged polyelectrolyte monolayers and multilayers under various analytical conditions—Application to protein analysis, Journal of Chromatography A, 1218 (2011) pp. 3537-3544.
Pei et al. Insight into the stability of poly(diallydimethylammoniumchloride) and polybrene poly cationic coatings in capillary electrophoresis, Journal of Chromatography A, 1365 (2014) pp. 226-233.
Ramautar et al. Evaluation of CE methods for global metabolic profiling of urine, Electrophoresis, 31 (2010) pp. 2319-2327.
Ramautar et al. Metabolic analysis of body fluids by capillary electrophoresis using noncovalently coated capillaries, Journal of Chromatography B, 871 (2008) pp. 370-374.
Ramautar et al. Metabolic profiling of human urine by CE-MS using a positively charged capillary coating and comparison with UPLC-MS, Molecular BioSystems, 7 (2011) pp. 194-199.
International Preliminary Report of Patentability; PCT/AU2017/050861; Dated Dec. 13, 2018.
International Search Report; PCT/AU2017/050861; Dated Sep. 27, 2017.
Breadmore, Electroosmotic flow-balanced isotachophoretic stacking with continuous electrokinetic injection for the concentration of anions in high conductivity samples. Journal of Chromatography A (2010) 1217: 3900-3906.
Graul et al. Capillaries Modified by Polyelectrolyte Multilayers for Electrophoretic Separations. Analytical Chemistry (1999) 71: 4007-4013.
Henry et al. Influence of polymer structure on electroosmotic flow and separation efficiency in successive multiple ionic layer coatings for microchip electrophoresis. (2008) 29: 3128-3134.
Katayama et al. Stable Capillary Coating with Successive Multiple Ionic Polymer Layers. Analytical Chemistry (1998) 70: 2254-2260.
Katayama et al. Stable Cationic Capillary Coating with Successive Multiple Ionic Polymer Layers for Capillary Electrophoresis. Analytical Chemistry (1998) 70: 5272-5277.
Lucy et al. Non-covalent capillary coatings for protein separations in capillary electrophoresis. Journal of Chromatography A (2008) 1184: 81-105.

(56) References Cited

OTHER PUBLICATIONS

Pirogov et al. Use of Ionenes as Capillary Modifiers in the Simultaneous Determination of Azide, Chlorate, and Perchlorate Ions by Capillary Electrophoresis. Journal of Analytical Chemistry (2003) 58: 781-784.
Sarazin et al. Identification and determination of inorganic anions in real extracts from pre- and post-blast residues by capillary electrophoresis. Journal of Chromotography A (2010) 1217: 6971-6978.
Katayama et al., "Stable Cationic Capillary Coating with Successive Multiple Ionic Polymer Layers for Capillary Electrophoresis", *Anal. Chem.* 1998, vol. 70, pp. 5272-5277.
Isemura et al., "Separation of complex mixtures of fluorobenzoic acids by capillary electrophoresis". J. Sep. Sci. 2009, 32, 381-387.
Von Harpe et al., "Characterization of commercially available and synthesized polyethylenimines for gene delivery", Journal of Controlled Release 69 (2000) 309-322.
Jayaraman et al., "Ion-exchange displacement chromatography of proteins; Dextran-based polyelectrolytes as high affinity displacers", Journal of Chromatography, 630, pp. 53-68 (1993).

\* cited by examiner

INORGANIC ION DETECTION SYSTEM AND METHODS

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/AU2017/050861 which has an International Filing Date of Aug. 15, 2017, which designates the United States of America, and which claims priority to Australian Application No. 2016903232 filed Aug. 15, 2016, and Australian Application No. 2017902304 filed Jun. 16, 2017. Each of the aforementioned applications is incorporated by reference herein in its entirety, and each is hereby expressly made a part of this specification.

FIELD

The present invention relates to systems and methods for the separation and detection of inorganic anions in a sample using electrophoresis, such as capillary electrophoresis. The systems and methods have particular application in the analysis of samples to enable the detection of the presence inorganic anions typically present in explosives. The present invention also relates to capillaries, kits and uses associated with the systems and methods.

BACKGROUND

There is considerable interest in the development of fast and reliable analytical methods for the identification of explosives since the results provided by these analyses constitute an indispensable tool during the investigations and prevention of terrorist attacks.

Inorganic improvised explosive devices (IEDs) are based on combinations of strong inorganic oxidizers and fuels. In contrast to the strictly controlled organic high explosives, inorganic IED components can be easily and legally obtained at low cost. Manufacture of IEDs from these components is also relatively simple.

Detection of explosive residues can be broadly categorised into either pre-blast or post-blast analysis. Post-blast analysis deals with the analysis and identification of explosives from the area directly around the site of a blast. Pre-blast analysis on the other hand involves the identification of explosive components with some kind of device and is employed in mass transit locations, cargo entry points and secure facilities. While both categories of detection are important, the preventative nature of pre-blast detection makes it extremely useful. Pre-blast detection can be achieved using bulk detection technology (such as X-Ray, Raman and IR) or explosive trace detection (ETD). Trace detection involves explosive residue or markers being removed from a surface (these can be skin, clothing, bags etc.) using a swab (or a puff of air) which is then placed in an instrument and a measurement of the amount of each explosive provided.

Direct pre-blast analysis using Ion Mobility Spectrometry (IMS) and Gas Chromatography—Mass Spectrometry (GC-MS) are currently in use in most major airports around the world. Swab samples are inserted directly into these instruments for a result to be delivered seconds later, however their applicability to inorganic or peroxide based explosives is limited due to the physicochemical nature of the target species.

Capillary electrophoresis (CE) offers an attractive combination of characteristics having potential for the identification of inorganic IEDs. The main limitations of using CE are relatively high limits of detection, difficulties in obtaining reproducible migration times in existing forms of separation columns, and relatively long analysis times.

There is therefore a need for alternative or improved methods, systems and/or components for the detection of inorganic anions of a type present in inorganic IEDs. It is desirable for embodiments to achieve adequate resolution between ions, and separations within reasonable timeframes, and with reliable reproducibility.

SUMMARY

According to a first aspect, there is provided a system for the separation and detection of inorganic anions in a sample, the system comprising:
  a separation channel with an inner coating of three or more alternating layers of a cationic polymer and an anionic polymer, wherein the first layer and the final layer are cationic polymer layers;
  a detector for detecting inorganic anions that pass through a detection zone of the separation channel;
  an injection system for injecting fluids including sample solutions and background electrolyte into an inlet end of the separation channel;
  wherein the background electrolyte comprises polyethyleneimine, and the cationic polymer forming the cationic polymer layers is not polyethyleneimine.

The cationic polymer used to coat the separation channel may be a tertiary amine polycation or a quaternary amine polycation (such as a hexadimethrine polymer). The anionic polymer used to coat the separation channel may be sulfonated or sulphated polymer or copolymer, such as polystyrene sulfonate.

According to a second aspect, there is provided a system for the separation and detection of inorganic anions in a sample, the system comprising:
  a receiver shaped to receive a replaceable cartridge that contains a separation channel with an inner coating of three or more alternating layers of a cationic polymer and an anionic polymer, wherein the first layer and the final layer are cationic polymer layers;
  a detector positioned to detect inorganic anions that pass through a detection zone of the separation channel when the cartridge containing the separation channel is positioned in the receiver;
  an injection system for injecting fluids including sample solutions and background electrolyte into an inlet end of the separation channel contained in the cartridge, when the cartridge is positioned in the receiver;
  a controller for controlling the injection system, flow of fluids, operation of the detector for the detection of the inorganic anions.

The combination of the use of alternating layers of cationic polymer and anionic polymer with the use of a further cationic polymer in the background electrolyte, provides a reduction of separation time while maintaining adequate efficiency and resolution. The alternating layers of cationic polymer and anionic polymer control the electro-osmotic flow, while the presence of a further cationic polymer in the background electrolyte alters the separation selectivity by means of an ion exchange mechanism. In addition, the increased stability of the multilayer coating of the separation channel permits an extended channel lifetime while maintaining good separation resolution of the inorganic anions. The combination of rapid separation and longer running duration makes the electrophoresis system suitable for automation and high sample throughput applications.

According to the first and second aspects, and those that follow, the coating is on the inner surface of the channel or capillary that comes into contact with the fluid that passes along the channel, such as the background electrolyte.

In a third aspect, there is provided a method for the separation and detection of inorganic anions in a sample using electrophoresis, the method comprising a sample processing sequence which comprises:
introducing a sample and a background electrolyte comprising polyethyleneimine into a separation channel coated with alternating layers of a cationic polymer and an anionic polymer, wherein the first layer and the final layer of the separation channel coating are cationic polymer layers, and the cationic polymer forming the cationic polymer layers is not polyethyleneimine;
applying a voltage potential across the separation channel to effect a separation of the inorganic anions; and
detecting the presence of the separated inorganic anions.

The system may further comprise a fluid flow generator, such as a pump, for generating the flow of background electrolyte through the injection system and separation channel.

The system may further comprise a controller which controls the injection system, flow of background electrolyte through the injection system and separation channel and the voltage applied across the electrodes.

In a fourth aspect, there is provided a separation capillary for the separation and detection of inorganic anions in a sample, comprising an internal coating of three or more alternating layers of a hexadimethrine polymer and polystyrene sulfonate or a copolymer, salt or derivative thereof wherein the first layer and the final layer are hexadimethrine bromide layers.

A capillary that is coated with alternating layers of a cationic hexadimethrine polymer, such as hexadimethrine bromide, and anionic polystyrene sulfonate has increased stability compared to a capillary coated with a single layer of cationic polymer. Improved stability of the coating extends the number of runs over which the system maintains reproducibility of migration time and retention of EOF.

In a fifth aspect, there is provided a cartridge comprising this separation capillary. The cartridge may also include a background electrolyte reservoir comprising the background electrolyte as described herein. Including the capillary in a cartridge, which is shaped for releasable insertion into the system (or device) for performing the separations, allows for fast replenishment of the consumables in the device, and can be performed by the unskilled users in the field.

In other variations, instead of devising the system with a replaceable cartridges containing the separation capillary and background electrolyte, the solutions required to form the coating in situ, and to replenish the background electrolyte, can be packaged together and sold as a kit. In such cases, there is provided a reagent kit comprising:
a first capillary coating composition comprising a hexadimethrine polymer;
a second capillary coating composition comprising polystyrene sulfonate; and
a background electrolyte composition comprising polyethyleneimine.

Another form of kit may comprise:
a separation capillary comprising an inner coating of three or more alternating layers of hexadimethrine bromide and polystyrene sulfonate, wherein the first layer and the final layer are hexadimethrine bromide layers; and
a background electrolyte composition comprising polyethyleneimine.

BRIEF DESCRIPTION OF THE DRAWINGS

It is noted that in all of the Figures, where peaks are shown with numerical references, those peak references are: 1=chloride, 2=nitrate, 3=chlorate, 4=fluoride, 5=perchlorate, 6=thiocyanate, 7=carbonate, 8=propanesulfonate, 9=sulphate, 10=methanesulfonate, 12=formate and 13=pentanesulfonate.

DETAILED DESCRIPTION

Figure 1:
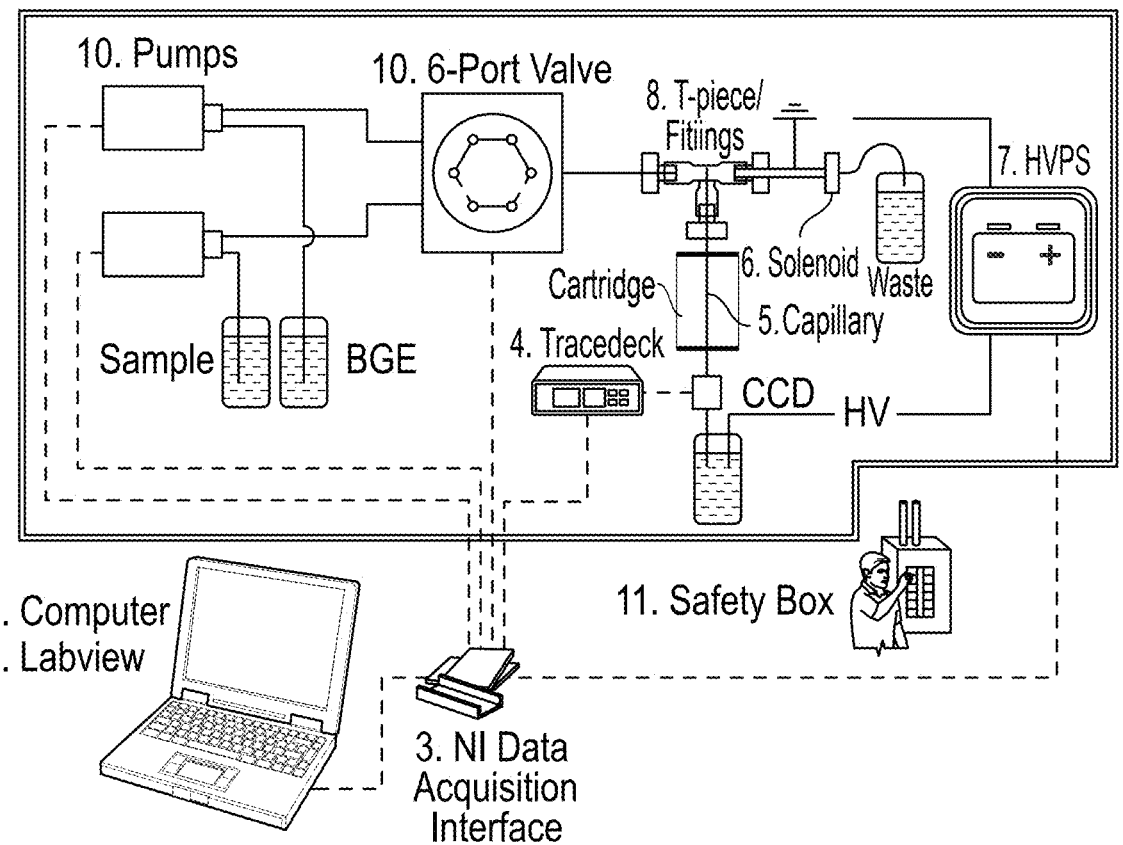
FIG. 1 is a schematic diagram of the Scantex SI-CE setup.

As described above, the present application involves the use of alternating layers of cationic polymer and anionic polymer as a coating on the separation channel in systems or methods for the separation and detection of inorganic anions in a sample using electrophoresis. In the following we describe the use of the multilayered coating on the separation channel, which in some embodiments, is combined with the use of a cationic polymer in the background electrolyte. Capillary electrophoresis, and the use of a separation capillary is also described, although it will be appreciated that the present invention extends to the use of other forms of separation channels and not just capillaries.

Separation Channel

The term "separation channel" encompasses separation capillaries, and other channel arrangements such as micromachined channels in microchips, through which separation of analytes or ions can be effected. In the following, where references are made to capillary electrophoresis, it will be understood that the same arrangement may be applied to other forms of electrophoresis such as microchip electrophoresis and MEKC, and therefore such references are not limiting in this regard.

The separation channel may be a fused silica capillary. Using smaller bore capillaries allows a decrease in analysis time resulting from increased electroosmotic flow (EOF) caused by the greater surface to volume ratio in the smaller capillary. The separation capillary may have an internal diameter of about 10 to 100 µm, such as 10 to 75 µm, 10 to 50 µm, 20 to 50 µm, 20 to 30 µm, 25 to 50 µm. The separation capillary may have a nominal internal diameter of 25 microns, 30 microns or 50 microns.

The use of smaller bore capillaries, for example using a 25 µm capillaries, allows separation of target anions in under 50 seconds using a separation voltage of only 25 kV. As another example, the use of 50 µm capillaries leads to separation times around 60 seconds. While these differences are relatively small they can be significant when summed up over the course of days or weeks of continual use.

The length of the separation capillary may be about 15 cm or longer, and up to 100 cm, although shorter capillary lengths of between 15 cm and 60 cm are preferred, for shorter separation times. This length refers to the total column length. It is noted that the detection zone will typically be spaced apart from the exit end of the capillary, so the effective length is shorter by a length corresponding to the detection zone location. The length of the separation capillaries used in the Examples were from 20 to 60 cm.

The separation channel, such as a fused silica capillary, is coated with three or more alternating layers of cationic polymer and anionic polymer such that the first layer (the innermost layer) and the final layer (the outermost layer) of the coating are both cationic polymer layers. The layers are on the inner surface of the channel or capillary. In this arrangement, the alternating layers of cationic and anionic polymer result in the formation of a stable coating. As one example, the first layer of cationic polymer is formed on the negatively charged surface of the separation capillary (such as a fused silica capillary which is initially treated with a base to form an anionic surface), followed by a second layer of anionic polymer on the positively charged surface of the first cationic polymer layer, and finally a third layer of cationic polymer is formed on the negatively charged surface of the anionic polymer, leaving a cationic polymer layer as the last layer. It will be appreciated that further alternating layers of cationic and anionic polymer can be added to the coating, provided that the final layer (the outermost layer) is a cationic polymer layer.

The coating will have an odd number of layers. The number of layers is at least 3, and may be 3, 5, 7, 9, 11 or 13 layers. 3, 5 or 7 layers are preferred, with 3 being most preferred.

The cationic polymer used to coat the separation channel may be a tertiary amine polycation or a quaternary amine polycation. The cationic polymer used to coat the separation channel may be a hexadimethrine polymer or a polydiallyldimethylammonium polymer. Examples of hexadimethrine polymers include hexadimethrine bromide, hexadimethrine halides (the bromide, iodide, and so forth) and hexadimethrine hydroxide. Examples of polydiallyldimethylammonium polymers include polydiallyldimethylammonium chloride, polydiallyldimethylammonium halides (the chloride, bromide, iodide, and so forth), polydiallyldimethylammonium hydroxide, polydiallyldimethylammonium sulfate, polydiallyldimethylammonium bisulfate, polydiallyldimethylammonium carbonate, and polydiallyldimethylammonium acetate. The polydiallyldimethylammonium polymers may have a molecular weight of up to 1,000,000, and as one example, a molecular weight within the range of 100,000 to 1,000,000. In the examples, the cationic polymer used to coat the separation channel is hexadimethrine bromide.

The anionic polymer used to coat the separation channel may be a sulfonated or sulphated polymer or copolymer, such as polystyrene sulfonate, dextran sulfate, poly(vinylsulfonate) or a copolymer of a sulfonated or sulphated monomer with a second monomer such as an acrylic acid or ester, one example being poly(4-styrenesulfonic acid-co-maleic acid). Notable examples are polystyrene sulfonate and copolymers, salts or derivatives thereof. Copolymers of polystyrene sulfonate may include polystyrene sulfonate together with other copolymerizable monomers, such as other aromatic monomers, vinyl monomers, acrylic acid monomers or ester monomers, each of which may be sulfonated or unsulfonated. Salts of polystyrene sulfonate may include sodium, calcium and potassium salts. Derivatives of polystyrene sulfonate may include alkyl derivatives of polystyrene sulfonate such as polystyrene ethanesulfonate. In the examples, the anionic polymer used to coat the separation channel is polystyrene sulfonate. The polystyrene sulfonate may have a molecular weight of up to 10,000, and as one example, a molecular weight within the range of 500 to 10,000.

The separation channel has been described as having "an inner coating of three or more alternating layers of a cationic polymer and an anionic polymer, wherein the first layer and the final layer are cationic polymer layers". Another way of describing the coating of the separation channel is as having "an odd number of inner coating layers equal to or greater than three, including a first coating layer of a cationic polymer, a second coating layer of an anionic polymer, and a third coating layer of said cationic polymer forming the first layer". These two quoted expressions can be used interchangeably.

The separation channel or capillary may be supplied with the system (device), or may be supplied as a separate consumable. In either case, the separation channel may be pre-coated with alternating layers of cationic polymer and anionic polymer, or it may be coated in situ. Generally, coating can be achieved by initially treating the channel with a treatment solution (for example treating the channel with an alkali solution) followed by passing capillary coating compositions comprising each of the polymers through the separation channel in sequential order. A suitable treatment solution comprises a weak alkaline solution, such as a 1M NaOH solution, followed by washing with water (such as Milli-Q water). The first capillary coating composition is passed through the separation channel and then removed prior to introducing the second capillary coating composition and subsequent capillary coating compositions. The time period of passing the capillary coating compositions through the channel is between about 1 and 10 minutes, such as about 5 minutes. During the coating sequence, the flow rate used may be in the region of about 1 to 100 µL/min, but the flow rate may vary from this depending on the internal diameter of the capillary. The capillary coating compositions may comprise between 0.01% and 20% of the cationic polymer (for the first capillary coating composition) or anionic polymer (for the second capillary coating composition), such as between 0.1% and 10% polymer, with a 1% solution being particularly suitable. The capillary coating compositions are applied sequentially such that the first layer (i.e. the layer adjacent the channel wall and connected to the channel wall silica through electrostatic interaction) and the final layer are made from the first capillary coating composition which contains the cationic polymer. This results in the coating having a positive surface, and the channel having a positively charged inner surface.

The resulting separation channel has a stable coating, an extended lifetime and can be reproducibly prepared. Under certain conditions, the channel may be used repeatedly for up to 30,000 runs or up to 20,000 runs, while maintaining stability in relative migration times and/or resolution between adjacent peaks. In some embodiments, the channel may perform at up to 30,000, up to 20,000, at least 2,000, at least 1,000, from 1,000 to 30,000, from 1,000 to 20,000, from 2,000 to 30,000, from 2,000 to 20,000, from 1000 to 2000, from 300 to 30,000, from 300 to 20,000, from 300 to 2000, from 500 to 2000, from 300 to 1000, or from 500 to 100 sample separations sequences, while maintaining stability in relative migration times and/or resolution between adjacent peaks. The separation capillary may be used to performing multiple sample processing sequences before replacing the separation channel with a fresh separation channel. In some embodiments, the separation channel may be used to perform not less than 2000 or not less than 1000 sample processing sequences before replacing the separation channel with a fresh separation channel.

The capillary comprises a detection zone. This is spaced apart from the entrance to the capillary a distance sufficient for the separation to have taken place. In some embodiments, the capillary comprises a $C^4D$ detection zone located a suitable distance from the entrance to the capillary for the separation of inorganic anions to have occurred. In case an optical detector is used, there may be an optically transparent zone of the capillary to enable detection to take place by means of the detector.

During operation, a high voltage (HV) potential is applied along the separation channel between a pair of electrodes. The pair or electrodes are typically an HV electrode and a ground electrode. The voltage potential drives the ions in the sample through the separation channel towards the HV electrode. The capillary includes a low voltage (LV) end and a HV end. The detection zone is positioned towards the HV end.

A high voltage is applied across the separation column (longitudinally) during the separation stage when there is a flow of background electrolyte through the fluid channel. Typical voltages applied during this step are up to −50 kV, such as about −20 to −45 kV, about −30 to −50 kV, about −20 to −45 kV, about −25 to −45 kV or about −30 to −40 kV.

Detector

The detector may be any suitable form of detector for detecting the presence (and relative amount) of the inorganic anions. Examples include contactless conductivity detectors including capacitively-coupled contactless conductivity detectors ($C^4D$ detectors), contacting conductivity detectors having electrodes in contact with the capillary fluid and optical detectors (optical transmittance/absorbance detectors) such as photometric detectors. The detector used in the examples was a $C^4D$ detector. The signal produced by the detector may converted by a controller into a visual image to facilitate recording and analysis of the signal. The detector zone of the separation channel (separation capillary) is suitably positioned a distance between 5 cm and 15 cm from the outlet of the separation channel, such as at a distance of about 10 cm from the outlet of the separation channel. The detector is aligned with the detection zone.

The methods/systems enable the detection of the inorganic ions of interest at concentrations of 10 ppm or even less. The system enables the screening of a sample from extraction of that sample to analysis by the electrophoresis system within a 1 minute time-frame. In one embodiment, the time taken from sample injection to separation of inorganic anions by the electrophoresis system may be less than 1 minute and in some cases, less than 30 seconds. In another embodiment, the system separates inorganic ions include nitrate, perchlorate, azide and chlorate ions in a time frame of from 30 seconds to 2 minutes, from 30 seconds to 1 minute, from 20 seconds to 50 seconds or in less than 1 minute.

The inorganic anions that can be separated by the method/system include nitrate, perchlorate, azide and chlorate ions, which are present in explosives. The method/system also separates these inorganic anions from background ions which are not associated with explosives, such as chloride, sulfate, thiocyanate, fluoride, phosphate and carbonate. It is necessary to separate and detect each of these anions separately to ensure that false positive or false negative readings or analyses for the detection of explosives are not received.

Injection System

The injection system provides the injection of fluids including sample solutions and background electrolyte into an inlet end of the separation channel. In some embodiments, the injection system includes a sample injection system, a fluid channel in fluid communication with the sample injection port, and a background electrolyte reservoir for storing background electrolyte, in fluid communication with the sample injection system to enable flow of the fluid through the fluid channel and into an inlet end of the separation channel.

The sample injection system may comprise a sample injection port and may further comprise an injector valve which can be operated to control opening of the fluid channel to either the sample injection port, to enable sample entry into the fluid channel, or to the background electrolyte.

The method may involve a sample preparation step prior to performing the sample processing sequence. This may involve taking a swab of a surface and contacting the swab with a sample solution to extract inorganic anions into the sample solution. The sample solution may then be injected into the injection port.

The system may involve sequential injection of the sample followed by background electrolyte, which prevents or minimises dispersion of the "plug" of the sample through the diluting effect of the background electrolyte. High flow rates are consequently not required, which impacts on the separation efficiency, and there is a lower consumption of reagents. This sequential system enables the timeframe of the injection to be reduced to around 5 seconds or less.

The system may use pressure injection or electrokinetic injection to load the sample onto the separation capillary. Using electrokinetic injection a voltage potential may be applied across the capillary during the final stage of sample injection, to cause ions present in the sample to pass along the capillary.

The flow of fluids through the separation channel, including the background electrolyte, may be achieved through the operation of a pump, or any other fluid flow generator. The dimensions and components of the system leading to the separation channel may be as described in our earlier application PCT/AU2013/000889, the entire content of which is incorporated herein by reference.

The background electrolyte may be stored in a background electrolyte reservoir, which is in fluid communication with the injection system to enable it to flow through and into the separation channel. The background electrolyte reservoir may be located within the system (device) itself, or within a cartridge that may be inserted into the device. During the time period of the separation, the background electrolyte flow rate may be in the region of about 10 to 1000 µL/min, and typically it will be in the region of about 10 to 200 µL/min. A flow rate of 50 µL/min was used in the examples, and flow rates around this level are suited to the process.

The background electrolyte comprises a cationic polymer component, which is different to the cationic polymer used as the coating on the separation channel or capillary. The cationic polymer used in the background electrolyte may be a tertiary amine polycation or a quaternary amine polycation. The cationic polymer used in the background electrolyte may be a cationic surfactant. According to preferred embodiments the polymer component in the background electrolyte is polyethyleneimine (PEI).

The PEI may be a high molecular weight PEI, such as a PEI with a molecular weight of up to 1,000,000, such as up to 100,000, or 50-100,000, and as one example, 50-60,000. The amount of PEI in the background electrolyte is suitably within the range of about 0.01 to 0.5%, such as about 0.01 to 0.4%, 0.01 to 0.3%, 0.01 to 0.2%, 0.01 to 0.1%, 0.02 to 0.08%, 0.03 to 0.08% and 0.04 to 0.08%. A level of about 0.06% has been found to be effective.

The background electrolyte may further comprise one or more buffers, and any other typical electrolyte components. The buffer used in the background electrolyte may comprise any combination of strong bases and weak acids, strong acids and weak bases, or weak acids and weak bases. Examples of suitable buffers include Tris, CHES, phosphate, acetate, borate, formate, HEPES, bis-tris-propane, ethylenediamine and triethanolamine. In the example, the buffer used is Tris and CHES. The pH of the electrolyte may be in the range of about 7.5 to 11, about 8 to 10, or about 8 to 9. In some embodiments, the pH of the electrolyte is about 8.9, although depending on the other conditions prevailing, the pH could be +/−1.0 from this pH.

Further System Features

The system may comprise the separation channel (such as a capillary) in position ready for use, or the system may be supplied without the capillary, with the intention that separation capillaries will be purchased separately, and inserted directly or through their inclusion in a cartridge which is releasably inserted into the system. The system, which may be in the form of a portable device, may comprise a cartridge receiver, or capillary loading region for loading the cartridge or separation capillary into the desired location. The cartridge may be shaped to allow for releasable insertion into the system. The receiver of the system/device in this case has a complimentary shape to receive the cartridge, and may comprise clips, detents or other shaped features in this regard. The insertion of the cartridge positions the separation column or capillary into the correct location so that the sample processing can take place once inserted. Where the cartridge also contains background electrolyte reservoir, this aligns with components of the system/device so that the background electrolyte contained in the reservoir can flow through the system as required.

A control system, such as a computer, is used to operate the device. The controller controls the stages of operation of the device, including control of the injection system, control of the pump operation (and speed of flow of background electrolyte), application of the voltage potential and so forth. The control system may also control the detection system, including processing of the signal received by the detector, and converting that signal into a visual representation (on a display or otherwise). The control system may comprise a personal computer or a dedicated control system that is of a size suitable for portability of the device. The control system may in some embodiments control a separation channel coating sequence for application of an inner coating of three or more alternating layers of a cationic polymer and an anionic polymer. The controller will typically comprise a processor that processes computer readable instructions stored in an associated, tangible memory to present requests for input to a user, receive one or more inputs via the input device(s) and control the radiation source in accordance with the input and the instructions stored in the memory. The term "processor" is used to refer generically to any device that can process inputs in accordance with stored instructions to control a radiation source and can include: a microprocessor, microcontroller, programmable logic device or other computational device, a general purpose computer (e.g. a PC) or a server.

The system may comprise a controller that suitably controls the injection system, flow of background electrolyte and the voltage applied to produce the following sequence of steps:
  injection of sample into the sample injection port to flow into an interface zone of the fluid channel without flow of background electrolyte through the fluid channel;
  application of a voltage potential across the electrodes prior to the following flushing step, to cause movement of inorganic anions present in the sample located in the interface zone into the separation channel;

flow of background electrolyte through the fluid channel to flush sample from the interface zone of the fluid channel without the application of a voltage potential across the electrodes;

application of a voltage potential across the electrodes following the flushing step, with flow of background electrolyte through the fluid channel, to effect separation of the inorganic anions in the sample.

The system may be in the form of a portable device. The device may be a one-part device, or in separate parts.

Kits

Embodiments comprising a cartridge are described above. In alternative embodiments, the system or device may be replenished with a reagent kit comprising:

a first capillary coating composition comprising hexadimethrine bromide;

a second capillary coating composition comprising polystyrene sulfonate; and a background electrolyte composition comprising polyethyleneimine.

The compositions for the kit are as described previously for the formation of the layers of the separation channel, and for the background electrolyte composition. The concentration of hexadimethrine polymer in the first capillary coating composition is typically in the range of 0.1 and 10% weight/volume, preferably 0.1-5% weight/volume. The same concentration ranges may be used for the polystyrene sulfonate solutions.

EXAMPLES

The present invention will now be described in further detail with reference to the following examples which demonstrate the principles underlying the invention, and specific embodiments of the invention. It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

1. Experimental 1.1 Chemicals

All reagents were analytical grade obtained from Sigma-Aldrich (Sydney, Australia) and were used as supplied unless stated otherwise. Dissolutions of reagents were always prepared in Milli-Q water (Millipore, Bedford, MA, USA). Anion standard solutions of (1000 µgL$^{-1}$) were prepared by dissolution of the sodium or potassium salt of perchlorate, chlorate, phosphate, nitrate, sulfate (BDH, Kilsyth, VIC, Australia), thiocyanate, chloride (Univar, Redmond, WA, USA), fluoride, azide (AJAX, Sydney-Melbourne, Australia). Sodium Propanesulfonate (Fluka, Buch, Switzerland) was used as an internal standard. These solutions were volumetrically diluted daily to prepare working standard solutions.

1.2 Background Electrolyte

The optimal background electrolyte consisted of 50 mM 2-Amino-2-hydroxymethyl-propane-1,3-diol (Tris) and 50 mM 2-(Cyclohexylamino)ethanesulfonic acid (CHES) at pH 8.9. PEI (poly(ethylenimine), M.W. 50-60000, ACROSS organics, Geel, Belgium) was added to alter the selectivity with an optimal concentration of 0.06% (w/v).

1.3 Electrophoretic Procedures

Separations were performed using fused-silica capillaries of 25 or 50 µm internal diameter from Polymicro Technologies (Phoenix, AZ, USA).

1.4 Capillary Coating

Hexadimethrine bromide (HDMB, polybrene) and Poly (sodium 4-styrenesulfonate) (PSS) were employed to coat the walls of the fused-silica capillaries in order to reverse the electroosmotic flow (EOF). Before applying the capillary coating reagents, the capillary is flushed with a solution of sodium hydroxide (NaOH).

Capillaries were coated using the following procedure:
1. Cut a 50 cm piece of 25 µm FS capillary.
2. Connect one end of the capillary to a disposable syringe containing 1M NaOH using an Upchurch FingerTight 10-32 Nut (P/N: F-300-01), high pressure ferrule (P/N: F-142X), 1/16×0.0155 FEP sleeve (P/N:F-242X) and a 10-32 female to female luer adaptor (P/N:P-659).
3. Load the syringe and capillary onto a syringe pump and set the flow rate to 0.03 ml/hour (0.5 µL/sec).
4. Flush the capillary with 1M NaOH for 10 min.
5. Replace the 1M NaOH syringe with another syringe containing filtered distilled water.
6. Flush the capillary with water for 10 min.
7. Replace the water syringe with another syringe containing 1% (w/v) hexadimethrine bromide (HDMB).
8. Flush the capillary with the HDMB for 15 min.
9. Following the HDMB flush remove the luer adapter and fully flush with water to remove any residual HDMB.
10. Attach the water syringe and flush the capillary for 10 min.
11. Replace the water syringe with another syringe containing 1% (w/v) polystyrene sulfonate (PSS).
12. Flush the capillary with the PSS for 15 min.
13. Following the PSS flush remove the luer adapter and fully flush with water to remove any residual PSS.
14. Attach the water syringe and flush the capillary for 10 min.
15. Replace the water syringe with the syringe containing 1% (w/v) HDMB.
16. Flush the capillary with the HDMB for 15 min.
17. Replace the HDMB syringe with a syringe containing BGE from for the In-BES (50 mM Tris/CHES+0.06% PEI).
16. Flush the capillary with the BGE for 60 min.
17. The capillary is now ready to be inserted into the In-BES.

1.5 Instrument

All experiments were performed with an in-house constructed sequential-injection-capillary electrophoresis unit (referred to as the Scantex SI-CE). A schematic illustration of the instrument is shown in FIG. 1. This consisted of two MilliGAT pumps which are capable of continuous BGE and sample supply. The pumps were used to deliver sample and BGE through the system. A six port injector valve (MXP-7980, Rheodyne, Oak Harbor, WA, USA) was employed to deliver sample or BGE to the interface. A commercial PEEK tee shaped connection (P-727, Upchurch Scientific, Oak Harbor, WA, USA) was used to interface the flow system and the CE capillary. Whilst these components were used in the unit used in the examples, variations on the instrumentation may be used, particularly for tailor-made units.

A stainless steel tube of 2 cm cut from a syringe needle (0.51 mm i.d.) worked as outlet and ground electrode simultaneously making the grand electrode circular in cross-section, or tubular. While the ground electrode used in the unit of the examples was of this construction, electrodes of a different shape, composition or construction can be used.

The interface was selected among commercial available options in base of a minimum internal volume (0.57 µL) and an internal diameter large enough (0.5 mm) to allow the capillary to be inserted into the centre of the interface. This internal diameter coincides with the internal diameters of the PEEK tubes employed to connect the injection valve and pump to the interface eliminating dead volumes and further reducing turbulences. The capillary tip was fixed at a constant position close to the centre of the interface with the help of a piece of capillary (360 µm O.D.) introduced across the horizontal arm of the tee. The outlet side of the capillary was introduced into a glass vial of 25 mL filled with BGE. With this design, electric fields up to 2000 $Vcm^{-1}$ were applied without significative current leakages.

A commercial capacitively-coupled contactless conductivity detector ($C^4D$) (Tracedec) was purchased from Innovative Sensor Technologies (Strassahof, Austria). Detection parameters were optimized for each capillary internal diameter and BGE composition. For the final selected conditions the detector operational parameters were: frequency, high; voltage, −6 Db; gain, 100% and offset, 004. It is noted that other C4D detectors can be used in place of the detector used in the examples. These can be obtained from other commercial suppliers or may be manufactured specifically for a unit produced on a commercial scale. An Agilent 35900E A/D converter (Agilent Technologies, Waldbronn, Germany) was used to interface the signal generated by the $C^4D$ with the Agilent Chemstation software used to record and analyse the signal. Again, other converters can be used. The detector head was positioned 10 cm from the outlet of the CE capillary and the effective length to the point of detection was total capillary length minus 10 cm during all the experiences unless otherwise is stated.

Separation was driven by a EMCO DX-250 high voltage power supply working under reversed polarity with the cathode (−) electrode immersed in the outlet glass vial.

The system was controlled with a personal computer using a RS232 serial connection for the syringe pump. Injector valve and high voltage power supply (polarity control, switch on/off and voltage output) were connected to the computer by means of a NI USB-6212 data acquisition device from National Instruments (Austin, TX, USA). The system was controlled using software written using LabView 8.1 from National Instruments. The same software was used to monitor the voltage and current provided by the power supply. For units produced on a commercial scale, bespoke hardware and software for performing the required functions may be used.

1.6 Operation Conditions

Operating conditions for the Scantex system are shown in Table 1. Full analysis of a swabbed sample is completed in under 60 seconds with 25 seconds taken by the Front End System (FES) to extract the swab and deliver the resultant sample to the Inorganic-Back End System (In-BES), which is the SI-CE for analysis of inorganic anions. An additional 10 seconds is then required by the In-BES to flush the sample solution from the CE T-piece prior to analysis. Full analysis by the In-BES is completed within 25 seconds, that being the time taken for the internal standard (methansulfonate) to migrate through the CE system.

TABLE 1

Parameters for the Scantex system.

| In-BES | Parameter |
| --- | --- |
| Capillary | 25 µm × 40 cm, HDMB/PSS/HDMB coated |
| BGE | 50 mM Tris/50 mM CHES + 0.06% PEI |
| Voltage | 40 kV |

TABLE 1-continued

Parameters for the Scantex system.

| In-BES | Parameter |
| --- | --- |
| Temperature | ~30° C. |
| Sampling | Sample passed across capillary inlet for 5-10 sec using FES pressure |
| Post sample BGE flow | 10 sec @15 µL/sec |
| Post analysis flush | 60 sec @ 100 mbar |

Figure 2:
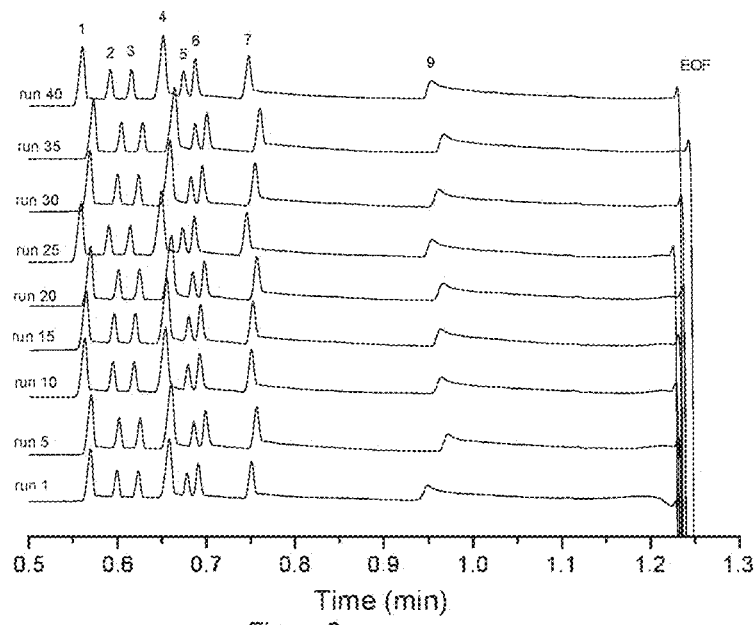
FIG. 2 is an electropherogram obtained from analysis of target anion mix (1 ppm) using the instrumental layout shown in FIG. 1 and the following conditions: BGE: 50 mM Tris/CHES+0.05% PEI, Capillary: 25 μm×35 cm (26.5 cm to detector) HDMB coated, Voltage: 25 kV, Injection 1 kV for 1 sec. Capillary flushed between runs. Sample anions at 2 ppm.

FIG. 2 shows the separation achieved using the instrumental layout shown in FIG. 1, using a single-layer HDMB coated capillary and a background electrolyte containing 50 mM Tris/CHES and 0.05% PEI (comparison compositions) rather than the coated capillary of the invention. The target compounds (nitrate, chlorate and perchlorate) were all fully resolved within 45 seconds, and reproducibility of the system was good over 40 consecutive runs.

2. Chemistry Optimisation 2.1 Selection of Analytes

Four inorganic anions were selected as targets for explosive identification. Perchlorate, chlorate and nitrate are the most common oxidizers employed on IEDs as potassium or ammonium salts. Lead azide is commonly utilized as part of detonators to initiate secondary explosives.

Chloride, sulfate, phosphate and to lesser extent fluoride and thiocyanate are the most probable background ions that will be present in the samples. It is also important to consider carbonate which comes from the rapid dissolution of atmospheric $CO_2$ into the samples and standard solutions.

2.2 Background Electrolyte Composition

A background electrolyte containing 50 mM Tris, 50 mM CHES and 0.05% PEI was used as a starting composition. Use of this concentration in the system gave rise to the separation shown on the bottom trace of FIG. 3.

Full resolution is obtained for all target anions as well as possible contaminants. The effect of increasing the concentration of PEI is shown in the upper two separations and it can be seen that the resolution between fluoride and perchlorate is significantly improved. Furthermore, as will be shown later, fluoride proves to be a more pervasive contaminant when analysing real samples than thiocyanate.

Figure 3:
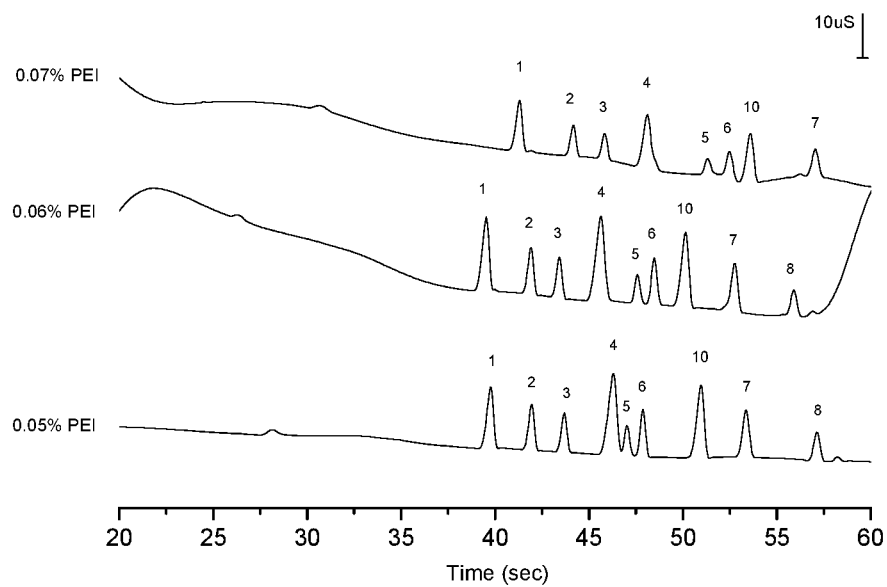
FIG. 3 is a comparison of electropherograms showing the effect of % PEI on the SI-CE separation of target anions. BGE: 50 mM Tris/CHES+varied PEI, Capillary: 25 μm×50 cm (36.5 cm to detector) HDMB/PSS/HDMB coated, Voltage: 50 kV, Injection 1 μL/sec for 0 sec. Capillary flushed between runs. Sample anions at 1 ppm except methanesulfonate at 5 ppm and propanesulfonate at 2 ppm.

Based on the results shown in FIG. 3, the preferred electrolyte composition was set with an amount of 0.06% PEI.

2.3 Comparison Example—Single Layer Capillary Coating

Figure 4:
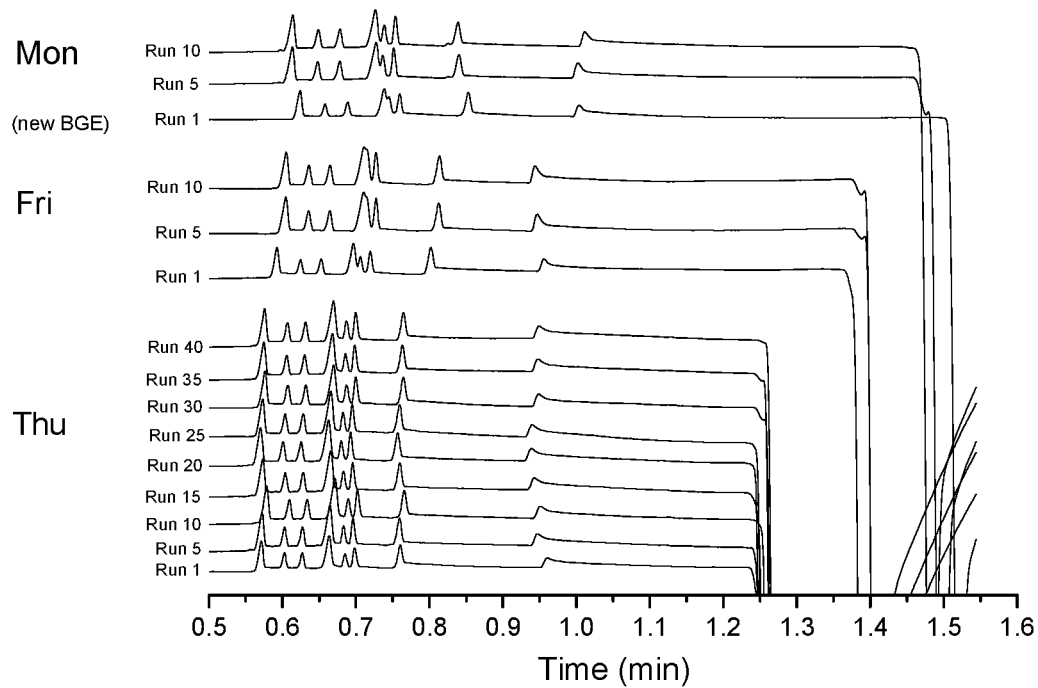
FIG. 4 is a comparison of electropherograms showing the reproducibility of the SI-CE system using capillaries coated with a single layer of HDMB and no flush step between analysis. BGE: 50 mM Tris/CHES+0.05% PEI, Capillary: 25 μm×35 cm (25 cm to detector) HDMB coated, Voltage: 25 kV, Injection 1 μL/sec for 1 sec.

FIG. 4 relates to a comparison example containing a capillary coated with a single layer of HDMB and no flush step between analysis. It can be seen that while reproducibility over a single day is relatively good, use of the same capillary over multiple days led to a decrease in the observed EOF (the large dip seen after migration of the analytes) as well as loss in resolution between some of the target anions.

Figure 5:
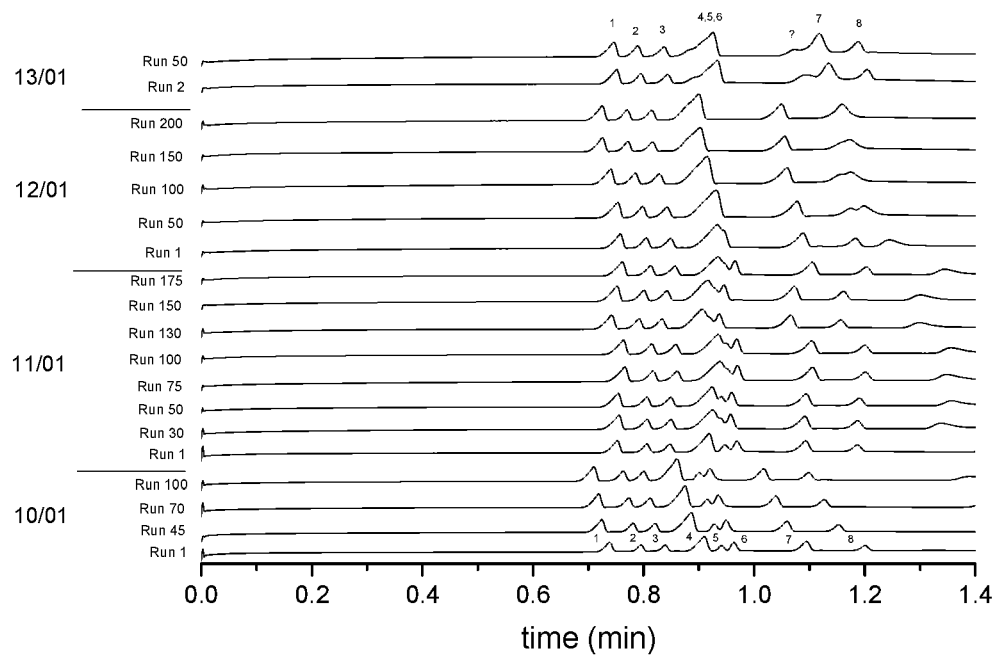
FIG. 5 is a comparison of electropherograms showing the reproducibility of the SI-CE system using capillaries coated with a single layer of HDMB and flushing with BGE between analysis. BGE: 50 mM Tris/CHES+0.05% PEI, Capillary: 25 μm×35 cm (25 cm to detector) HDMB coated, Voltage: 25 kV, Injection 0.5 μL/sec for 0.5 sec. Capillary flushed between runs. Sample anions at 2 ppm except propanesulfonate at 5 ppm.

FIG. 5 shows the reproducibility of the system using single coated capillaries and the use of a flush step between analyses. It can be seen that resolution of the target anions starts to deteriorate over the course of 2-4 days of continual use. The fact that analysis time remains constant suggests that the capillary coating is relatively stable, however, as shown in FIG. 4 the potential still remains for the coating to be slowly removed resulting in longer analysis times and potential loss of resolution.

Figure 6:
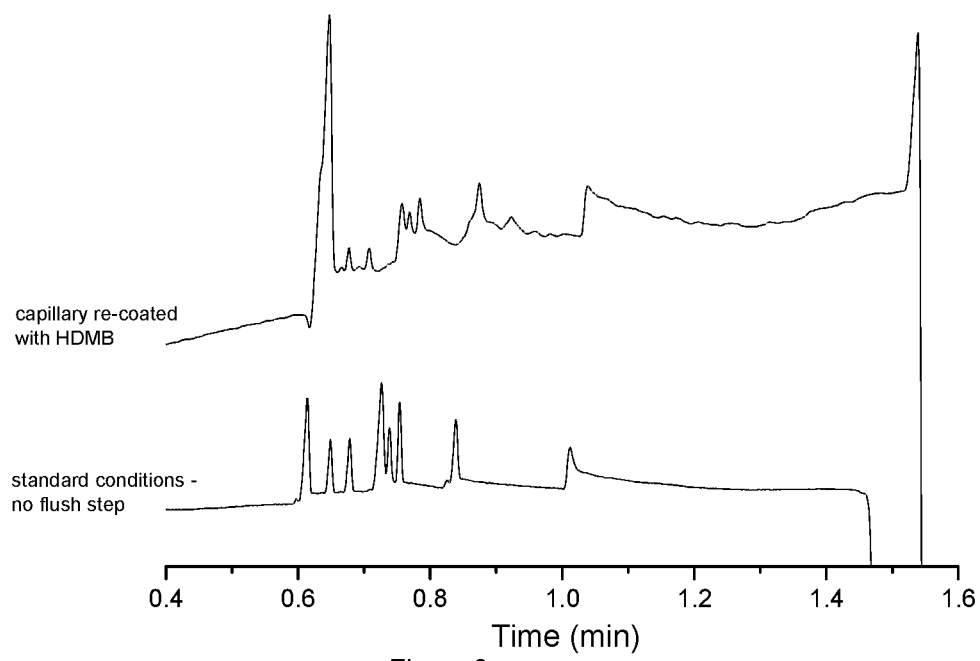
FIG. 6 is a comparison of electropherograms showing the effect of recoating a used capillary with a new layer of HDMB. BGE: 50 mM Tris/CHES+0.05% PEI, Capillary: 25 μm×35 cm (25 cm to detector) HDMB coated, Voltage: 25 kV, Injection 1 kV for 1 sec. Capillary flushed between runs.

Capillary ruggedness is important since it is not possible to recoat a capillary with a new layer of HDMB. This can be seen in FIG. 6 where the process of recoating a capillary with a fresh layer of HDMB was unsuccessful in resurrecting capillary performance.

The use of triple coated capillaries comprising a first layer of HDMB (as above) a subsequent layer of the anionic polymer polystyrenesulfonate (PSS) and a final layer of HDMB was tested. These triple coated capillaries showed similar separation performance to the single coated variety, but their ruggedness and useability was far superior.

Figure 7:
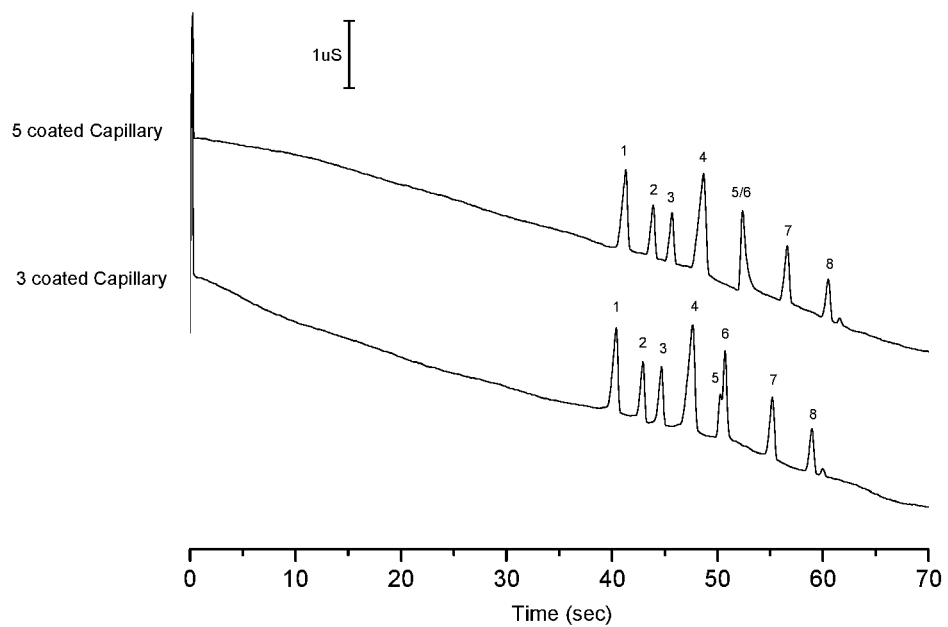
FIG. 7 is a comparison of electropherograms showing the Scantex SI-CE separation using either a 3 or 5 coated capillary. BGE: 50 mM Tris/CHES+0.07% PEI, Capillary: 25 μm×35 cm (25 cm to detector) HDMB/PSS/HDMB and HDMB/PSS/HDMB/PSS/HDMB coated, Voltage: 25 kV, Injection 0 μL/sec for 0 sec. Capillary flushed between runs. Sample anions at 2 ppm except propanesulfonate at 5 ppm.

The possibility of using 5 coated capillaries (HDMB/PSS/HDMB/PSS/HDMB) was also tested. FIG. 7 shows the comparison between separations obtained using a triple coated and 5-coated capillary.

Figure 8:
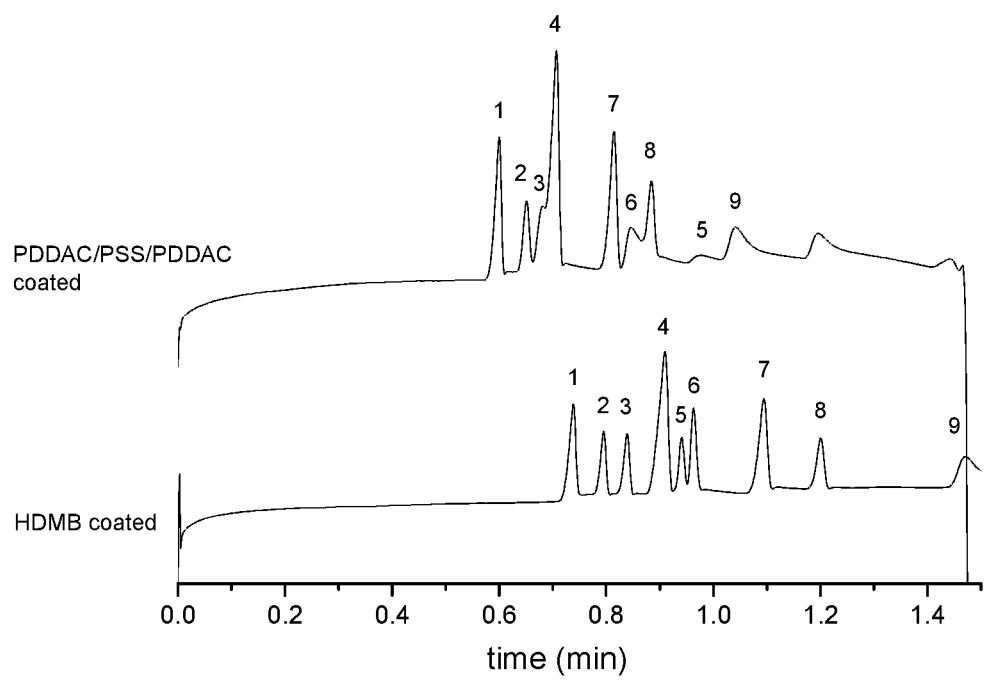
FIG. 8 is a comparison of electropherograms showing the separation achieved using HDMB and PDDAC coated capillaries with the Scantex SI-CE In-BES. BGE: 50 mM Tris/CHES+0.05% PEI, Capillary: 50 μm×35 cm (25 cm to detector) HDMB and PDDAC/PSS/PDDAC coated, Voltage: 25 kV, Injection 0.5 μL/sec for 0.5 sec. Capillary flushed between runs. Sample anions at 2 ppm except propanesulfonate at 5 ppm.

The use of the stronger cationic polymer polydiallydimethylammonium chloride (PDDAC) was also tested as this is known to form a stronger coating on the capillary surface than the pH dependent HDMB. FIG. 8 compares separations obtained using either an HDMB or a PDDAC/PSS/PDDAC based triple coated capillary. While both coatings give rise to reversed EOF and relatively fast separations (around 70 seconds using 25 kV) the performance of the HDMB coated capillary was superior to the PDDAC based capillary.

The multiple layer coated capillaries need to be replaced from time to time. Capillary to capillary reproducibility is therefore an important consideration such that reliable results can be expected when a new capillary is installed.

The procedure required to prepare a HDMB/PSS/HDMB triple coated capillary is shown in Table 2. It involves flushing the polymer solutions through the capillary in sequential order making sure to thoroughly remove the previous polymer before introducing subsequent coating solutions.

Figure 9:
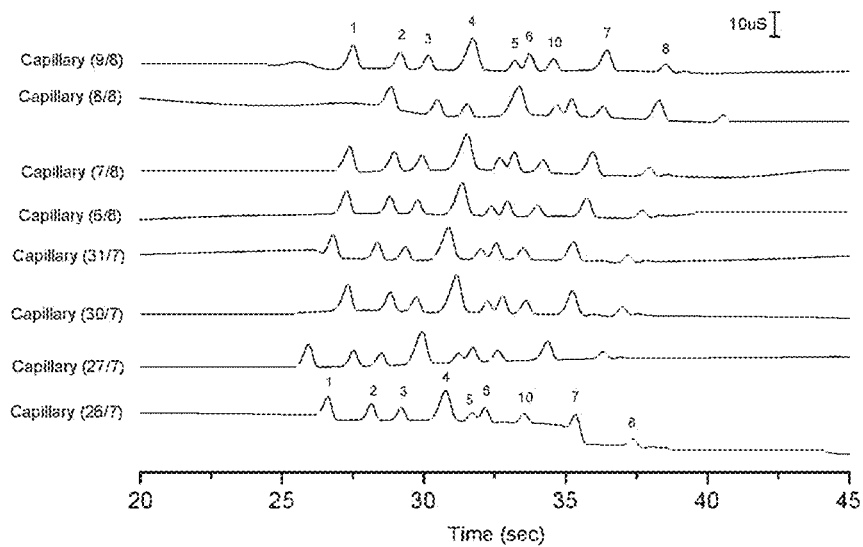
FIG. 9 is a comparison of electropherograms showing the capillary to capillary reproducibility using the coating procedure outlined in Table 2. BGE: 50 mM Tris/CHES+0.06% PEI, Capillary: 50 μm×40 cm (26.5 cm to detector) HDMB/PSS/HDMB coated, Voltage: 40 kV, Injection 0 μL/sec for 0 sec. Capillary flushed between runs. Sample anions at 1 ppm except propanesulfonate at 2 ppm.

FIG. 9 shows the SI-CE separations obtained using 8 different capillaries prepared using the procedure outlined in Table 2. It can be seen that good migration time reproducibility is obtained over the 8 capillaries tested. Furthermore, consistent resolution between target anions is maintained over all capillaries.

TABLE 2

Capillary coating procedure.

| Step No. | Description |
| --- | --- |
| Step 1 | Flush capillary with 1M sodium hydroxide for 5 min at 0.5 µL/min |
| Step 2 | Flush capillary with MilliQ water for 5 min at 0.5 µL/min |
| Step 3 | Flush capillary with 1%(w/v) HDMB solution for 10 min at 0.5 µL/min |
| Step 4 | Thoroughly rinse the syringe/capillary interface with water |
| Step 5 | Flush capillary with MilliQ water for 5 min at 0.5 µL/min |
| Step 6 | Flush capillary with 1%(w/v) PSS solution for 10 min at 0.5 µL/min |
| Step 7 | Thoroughly rinse the syringe/capillary interface with water |
| Step 8 | Flush capillary with MilliQ water for 5 min at 0.5 µL/min |
| Step 9 | Flush capillary with 1%(w/v) HDMB solution for 10 min at 0.5 µL/min |
| Step 10 | Thoroughly rinse the syringe/capillary interface with water |
| Step 11 | Flush capillary with BGE for 30 min at 0.5 µL/min |

Figure 10:
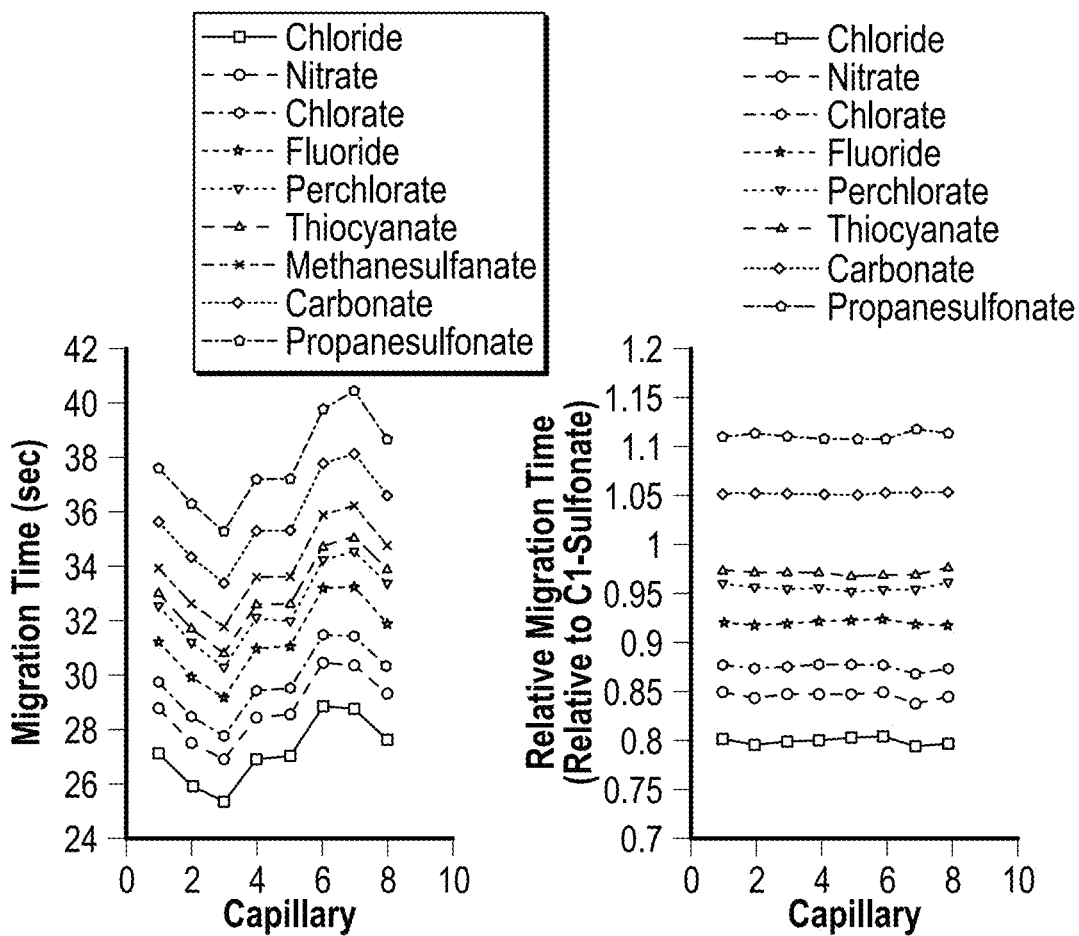
FIG. 10 is a graph showing the capillary to capillary reproducibility using the coating procedure.

FIG. 10 shows the migration time reproducibility of the 8 capillaries as well as the migration time relative to methanesulfonate (the IS) for the target anions. The relative migration times of the target anions over the 8 columns tested is very good (<0.48% RSD).

2.4 BGE Stability

Figure 11:
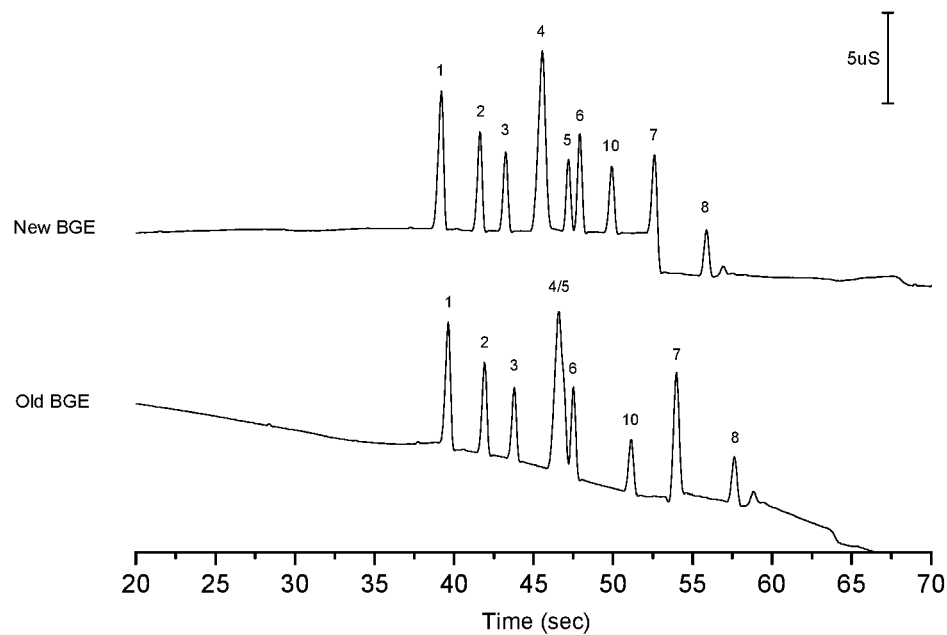
FIG. 11 is a comparison of electropherograms showing the effect of aging of the BGE on the In-BES separation of target anions. BGE: 50 mM Tris/CHES+0.06% PEI, Capillary: 25 μm×50 cm (36.5 cm to detector) HDMB/PSS/HDMB coated, Voltage: 50 kV, Injection 0 μL/sec for 0 sec. Capillary flushed between runs. Sample anions at 1 ppm except methanesulfonate and propanesulfonate at 2 ppm.

An issue important to system reproducibility is that of BGE stability. The lower trace in FIG. 11 shows a separation of the target anions using an old BGE stored under air and open to laboratory temperature fluctuations.

To minimize long term exposure of the BGE to air two approaches were investigated. The first involved the use of a carbon dioxide trap on the BGE reservoir. The trap held a carbon dioxide adsorbent (ascarite) such that air being drawn into the reservoir would have the carbon dioxide removed. While this approach proved effective at limiting the issue of adsorbed carbon dioxide it still left the BGE exposed to air. A subsequent approach involved the purging of the BGE reservoir with nitrogen each morning before use such that all air was removed from the BGE headspace. This approach proved simple and reliable and led to good BGE stability over days and even weeks of continual analysis.

2.5 Background Electrolyte pH

Figure 12:
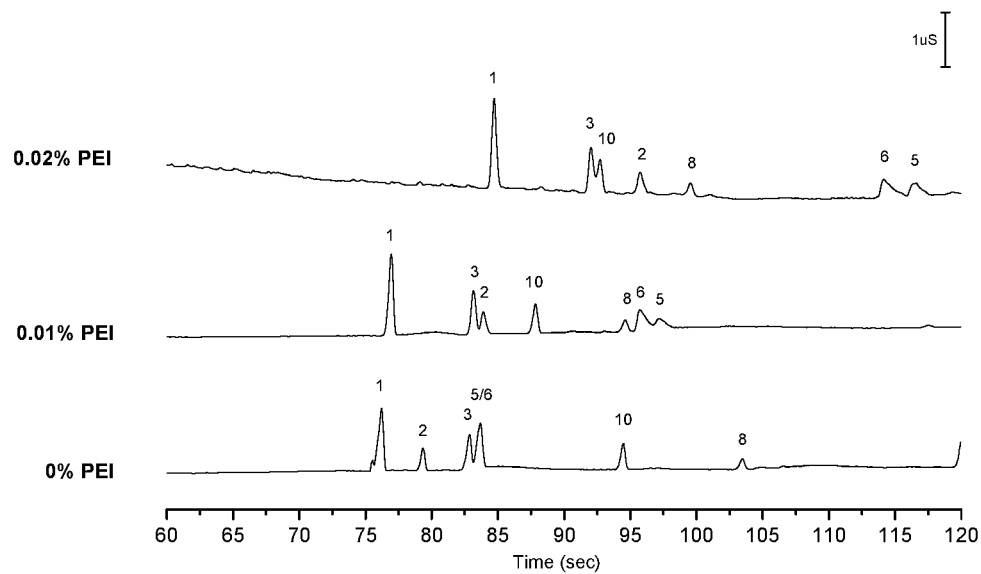
FIG. 12 is a comparison of electropherograms showing the effect of PEI on the Scantex In-BES separation at pH 6.0. BGE: 30 mM MES/21 mM Histidine at pH 6.0, Capillary: 50 μm×60 cm (46.5 cm to detector) HDMB/PSS/HDMB coated, Voltage: 40 kV, Injection: solenoid shut for 4 sec using FES pressure. Capillary flushed between runs.
Figure 13:
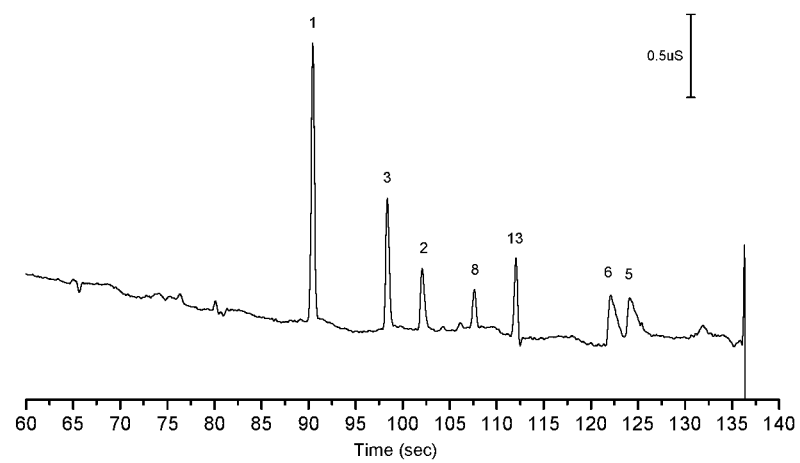
FIG. 13 an electropherograms showing the separation of target anion mix using Mes/Histidine BGE at pH 6.0. BGE: 30 mM MES/21 mM Histidine+0.02% PEI at pH 6.0, Capillary: 50 μm×60 cm (46.5 cm to detector) HDMB/PSS/HDMB coated, Voltage: 40 kV, Injection: solenoid shut for 4 sec using FES pressure. Capillary flushed between runs.

BGE pH was also investigated as an option for improving long term stability. The lower trace in FIG. 12 shows the In-BES separation of the 9 anion target mix using a MES/Histidine BGE at pH 6.0 with no PEI added to the BGE. Increasing the amount of PEI to 0.02% allows for full separation of the target ions from the potential background interferences (note that the internal standards, peaks 8 and 10, are added to the extraction solution and as such can easily be removed and/or replaced by different ISs). FIG. 13 shows an optimized separation of the target anion mix using a MES/Histidine BGE at pH 6.0 and removing the internal standard methanesulfonate.

2.6 Stability of Electroosmotic Flow (EOF)

Figure 14:
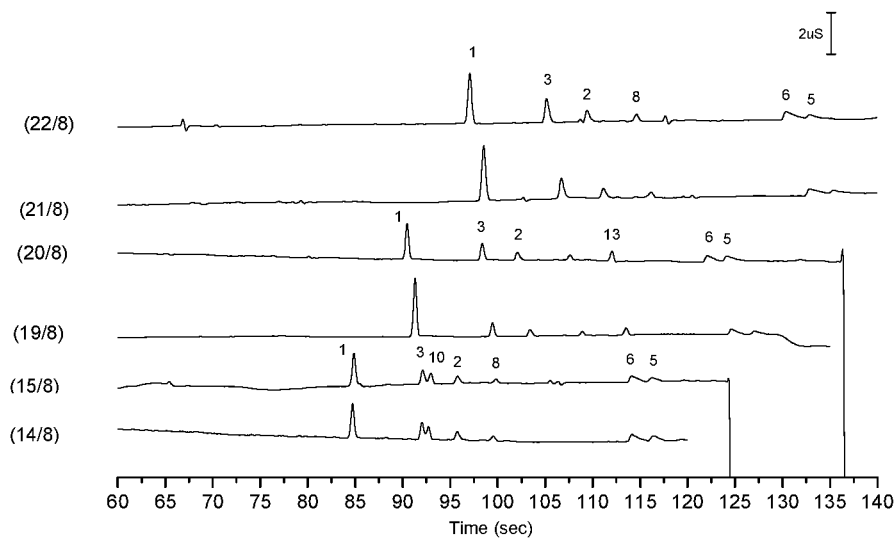
FIG. 14 is a comparison of electropherograms showing the EOF stability using MES/Histidine BGEs at pH 6.0. BGE: 30 mM MES/21 mM Histidine+0.02% PEI at pH 6.0, Capillary: 50 μm×60 cm (46.5 cm to detector) HDMB/PSS/HDMB coated, Voltage: 40 kV, Injection: solenoid shut for 4 sec using FES pressure. Capillary flushed between runs.

FIG. 14 shows EOF stability using MES/Histidine BGE at pH 6.0. PEI acts to stabilize the HDMB coating on the capillary wall, presumably by replacing any HDMB molecules that wash off the surface.

3. Hardware Optimisation

The analysis time for a given separation can be effectively reduced with the combination of shorter and smaller bore capillaries and higher voltages. However the time reduction has to be balanced with a separation of adequate resolution and sensitivity. The main instrumental variables affecting efficiency and performance of the separation were tested and optimized in order to reduce the analysis time while maintaining adequate separation characteristics.

3.1 Capillary Diameter

Figure 15:
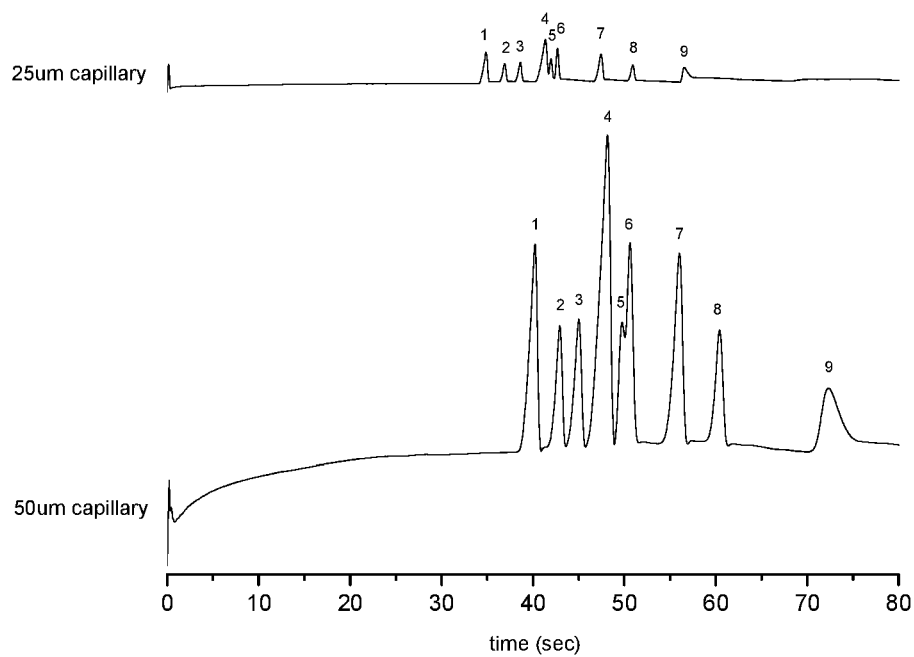
FIG. 15 is comparison of electropherograms showing the effect of capillary diameter on the observed separation. BGE: 50 mM Tris/CHES+0.05% PEI, Capillary: 25/50 μm×35 cm (26.5 cm to detector) HDMB coated, Voltage: 25 kV, Injection 1 μL/sec for 0.5 sec. Capillary flushed between runs. Anions at 2 ppm except propanesulfonate at 5 ppm.

The effect of capillary diameter on the observed Scantex SI-CE separation is shown in FIG. 15.

3.2 Voltage

The exact turnaround time required for the Scantex SI-CE system depends somewhat on the particular application to which it is applied. The EMCO DX-250 HV power supply can only produce 25 kV. The use of higher voltages was investigated using a Spellman SL120PN unit capable of generating up to 120 kV.

3.2.1 Interface Design

Figure 16:
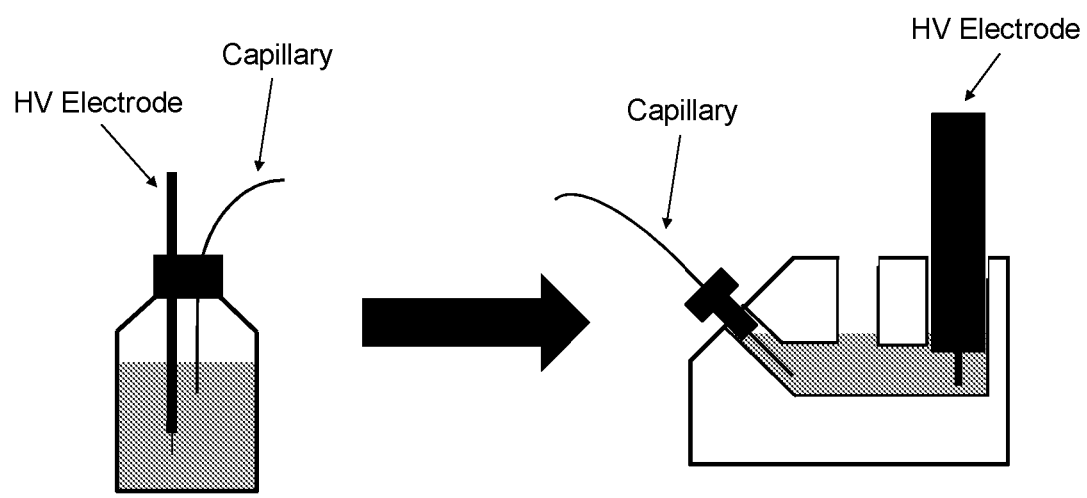
FIG. 16 is a schematic diagram showing modifications to the capillary outlet/high voltage interface.

FIG. 16 shows modifications made to the capillary outlet/high voltage interface within the Scantex SI-CE system.

3.2.2 Higher Voltage System Performance

Figure 17:
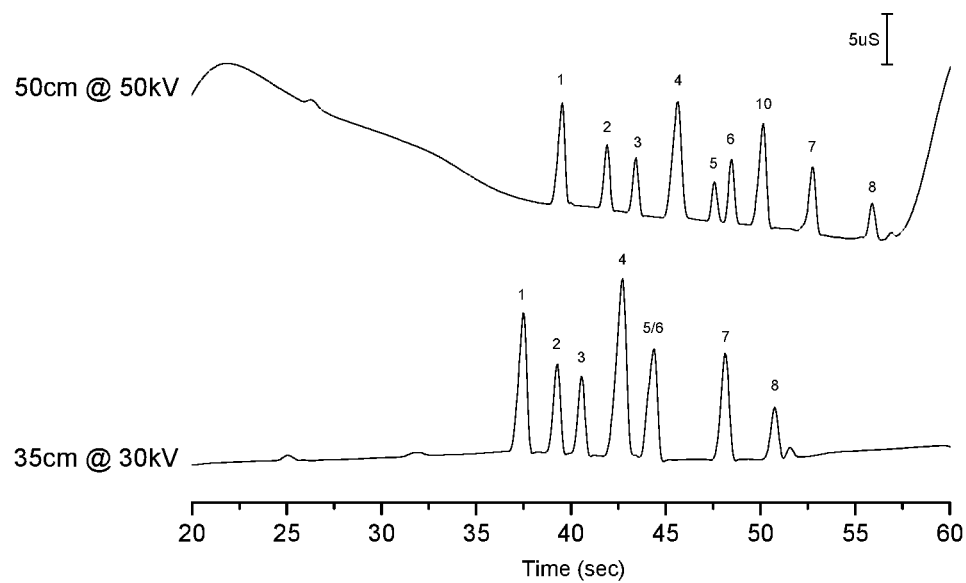
FIG. 17 is a comparison of electropherograms comparing voltages for the SI-CE separation of target inorganic explosive marker anions. BGE: 50 mM Tris/CHES+0.05% PEI, Capillary: 50 μm×35/50 cm (21.5/36.5 cm to detector) HDMB/PSS/HDMB coated, Voltage: 30/50 kv, Injection 1 μL/sec for 0 sec. Capillary flushed between runs. Sample anions at 1 ppm except propanesulfonate at 2 ppm.
Figure 18:
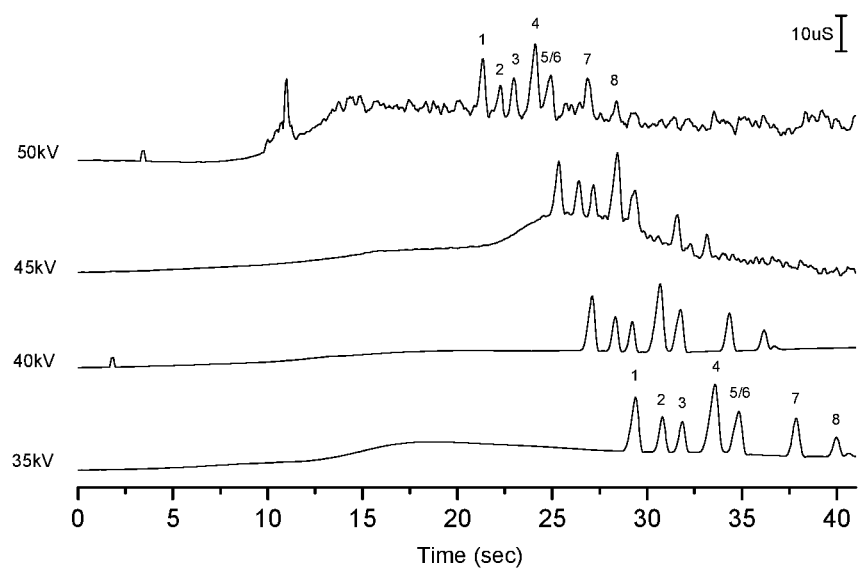
FIG. 18 is a comparison of electropherograms showing the effect of increased voltage on the SI-CE separation of target anions using the Spellman SL120PN HV supply and the interface shown in FIG. 16. BGE: 50 mM Tris/CHES+0.05% PEI, Capillary: 50 μm×35 cm (26.5 cm to detector) HDMB/PSS/HDMB coated, Voltage: as labelled, Injection 1 μL/sec for 0 sec. Capillary flushed between runs. Sample anions at 1 ppm except propanesulfonate at 2 ppm.

The advantage of higher separation voltages is shown in FIG. 17 where the use of 50 kV and a 50 cm capillary fully resolved all target anions within 60 s. FIG. 18 shows the HV separation of the target anions using the Spellman SL120PN unit at voltages up to 50 kV.

Figure 19:
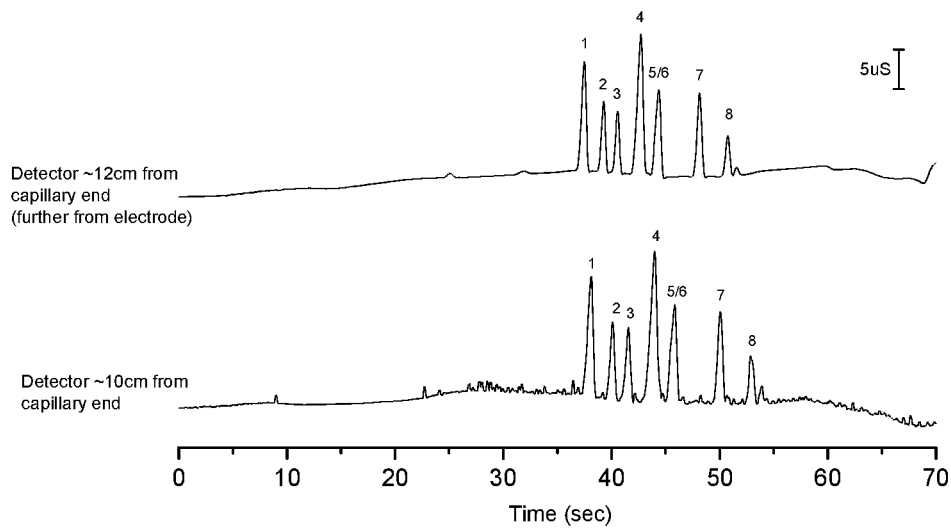
FIG. 19 is a comparison of electropherograms showing the effect of detector position on baseline stability using the Spellman SL120PN HV power supply. BGE: 50 mM Tris/CHES+0.05% PEI, Capillary: 50 μm×35 cm (~26.5 cm to detector) HDMB/PSS/HDMB coated, Voltage: 30 kV, Injection 1 μL/sec for 0 sec. Capillary flushed between runs. Sample anions at 1 ppm except propanesulfonate at 2 ppm.

FIG. 19 shows the effect of capillary position on the observed baselines when using the Scantex SI-CE system.

Figure 20:
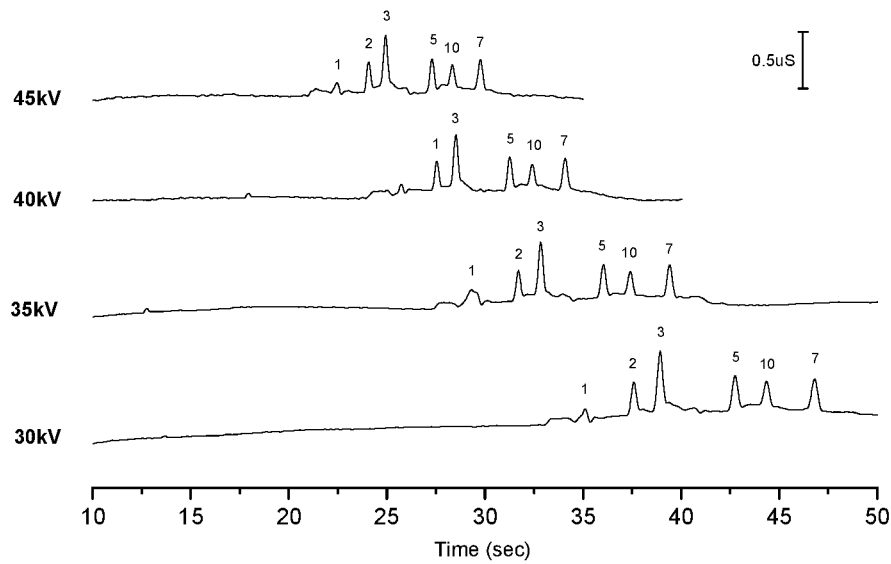
FIG. 20 is a comparison of electropherograms showing the separation time vs. applied voltage. BGE: 50 mM Tris/CHES+0.06% PEI, Capillary: 25 μm×40 cm (26.5 cm to detector) HDMB/PSS/HDMB coated, Voltage: as labelled, Injection 0 μL/sec for 0 sec. Capillary flushed between runs. Sample anions at 1 ppm.

FIG. 20 shows the separations obtained using a 40 cm capillary and voltages from 30-45 kV. As the voltage is increased the separation time is reduced with limited loss in resolution. While the full analysis is completed within 45 s using 30 kV (the time taken for the IS to migrate) this can be reduced to near 30 s by operating the system at 45 kV.

3.2.3 High Field Strengths

Figure 21:
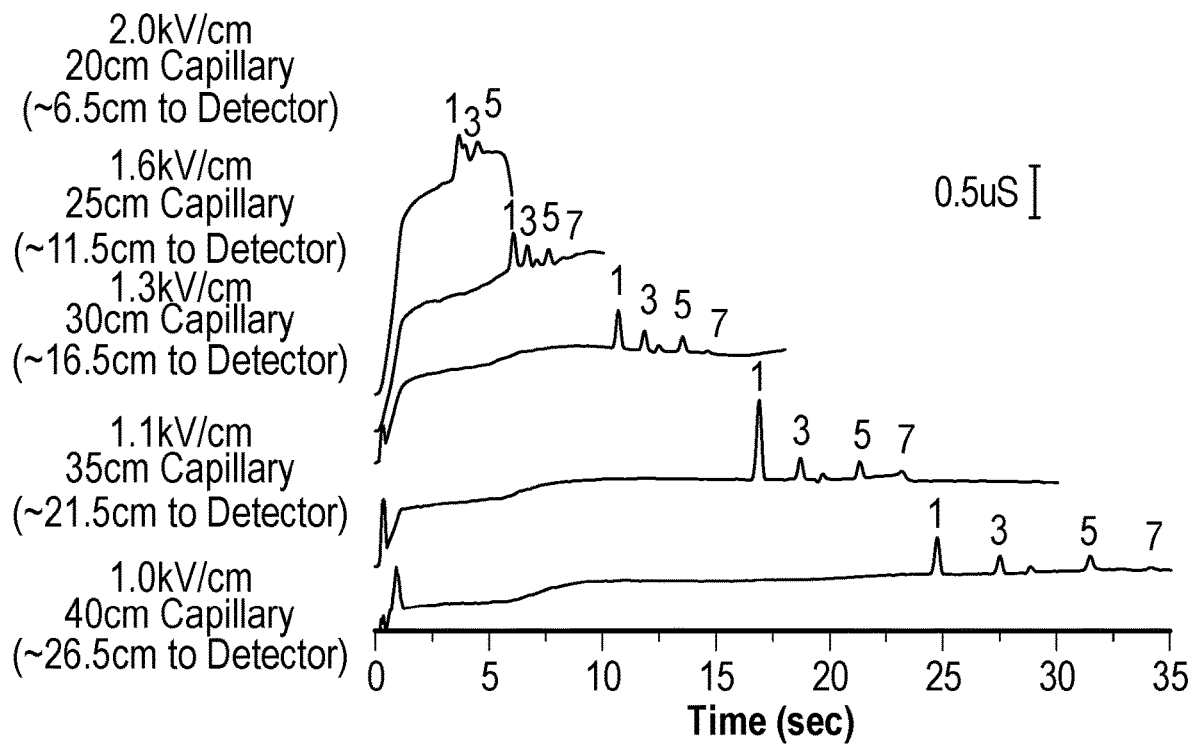
FIG. 21 is a comparison of electropherograms showing the high field strength separations using standard 375 μm OD fused silica capillaries. BGE: 50 mM Tris/CHES+0.06% PEI, Capillary: 25 μm (375 μm OD) HDMB/PSS/HDMB coated, length as labelled, Voltage: 40 kV, Injection 0 μL/sec for 0 sec. Capillary flushed between runs. Sample anions at 1 ppm.
Figure 22:
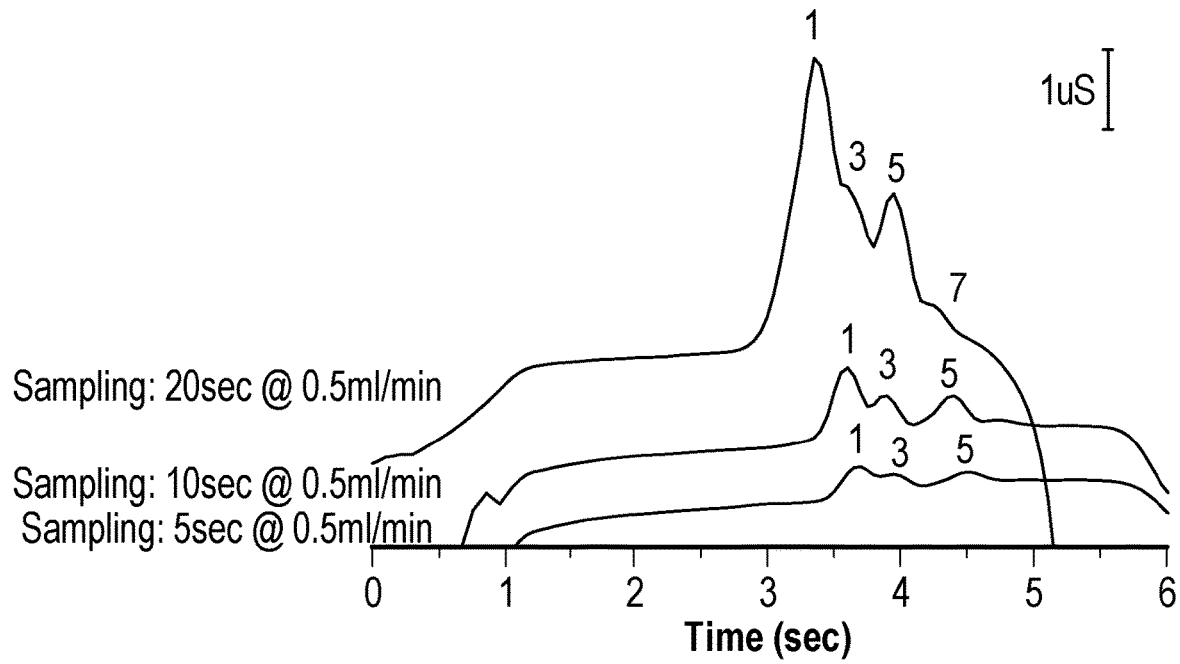
FIG. 22 is a comparison of electropherograms showing the high field strength separations using standard 375 μm OD fused silica capillaries. BGE: 50 mM Tris/CHES+0.06% PEI, Capillary: 25 μm (375 μm OD)×20 cm (6.5 cm to detector) HDMB/PSS/HDMB coated, Voltage: 40 kV, Injection as labelled. Capillary flushed between runs. Sample anions at 1 ppm.

FIG. 21 shows the high field strength separation of chlorate and perchlorate as well as the background anions chloride and carbonate. For this system we limited the applied voltage to 40 kV to improve reliability but progressively shortened the separation capillary thereby increasing the field strength from 1.0 kV/cm up to 2.0 kV/cm. It can be seen that while a relatively rapid separation of the 4 anions is obtained at a field strength of 1.0 kV/cm (corresponding to the use of a 40 cm capillary, 26.5 cm to detector) this can be significantly reduced as the field strength is increased. Full separation of the 4 anions is still observed for a field strength of 1.6 kV/cm (corresponding to a 25 cm capillary, 11.5 cm to detector) but the timescale of the separation is now well under 10 s.

3.2.4 Voltage Conclusions

From the investigation into the use of higher voltages and/or higher electric field strengths it was concluded that the best compromise between resolution, speed, and robustness was the use of 375 μm OD capillaries of between 30-50 cm. As such these conditions were used for subsequent test work.

3.3 T-Piece Design

Figure 23:
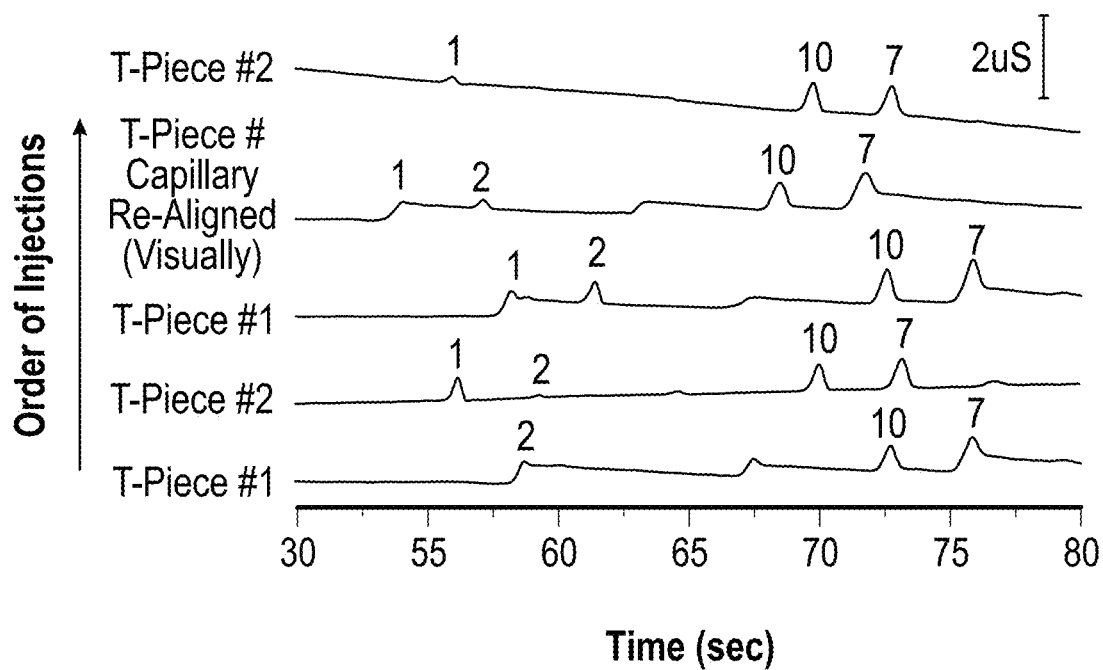
FIG. 23 is a comparison of electropherograms showing the effect of the different T-piece units used in the system. BGE: 50 mM Tris/CHES+0.055% PEI, Capillary: 25 μm×50 cm (36.5 cm to detector) HDMB/PSS/HDMB coated, Voltage: 40 kV, Injection FES pressure with solenoid shut for 5 sec. Capillary flushed between runs. Methanesulfonate at 1 ppm, other peaks remnants from swab.
Figure 24:
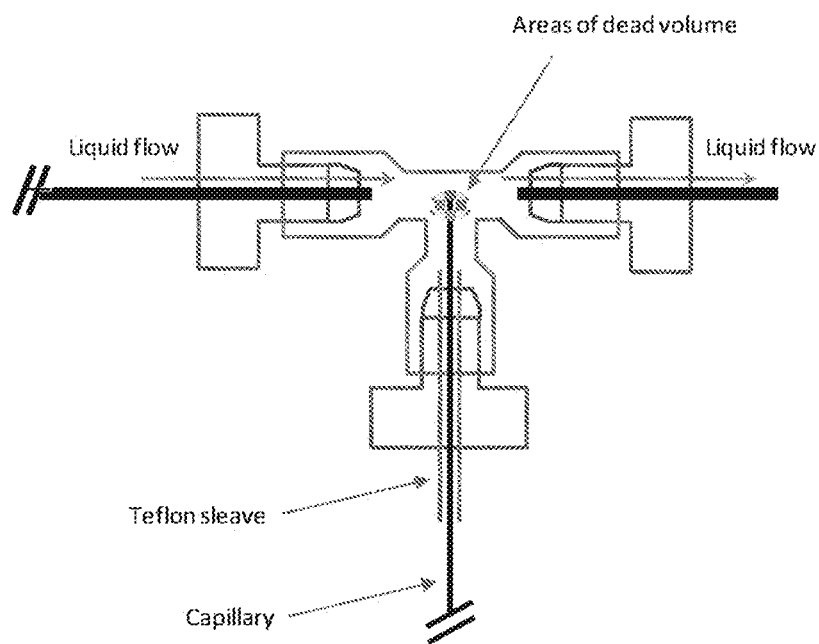
FIG. 24 is a schematic diagram of one T-piece design.
Figure 25:
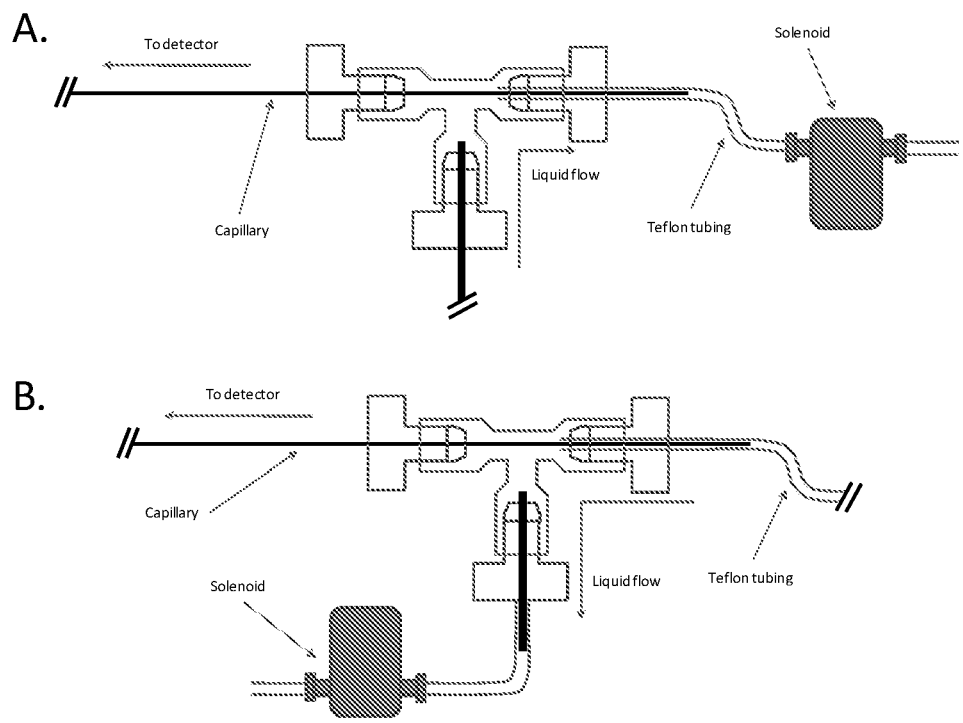
FIG. 25 is a schematic diagram showing alternative T-piece layouts for Scantex SI-CE system.
Figure 26:
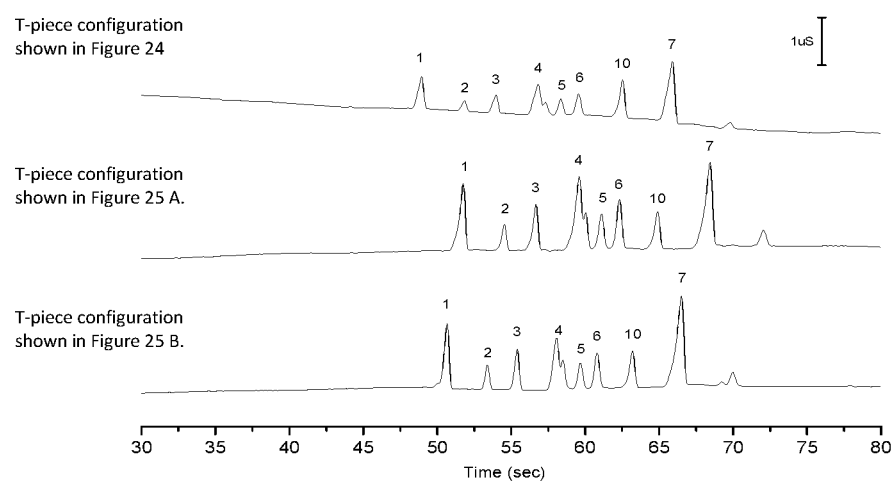
FIG. 26 is a comparison of electropherograms showing the separation of a 9 target anion standard using the three T-piece orientations shown in FIGS. 24 and 25. BGE: 50 mM Tris/CHES+0.06% PEI, Capillary: 25 μm×50 cm (36.5 cm to detector) HDMB/PSS/HDMB coated, Voltage: 40 kV, Injection: FES pressure with solenoid shut for 2 sec in the top separation and 4 sec for the lower two separations. Capillary flushed between runs.

FIG. 23 shows the separations obtained when using two different T-piece units (same type and supplier). FIG. 24 shows the volume within the T-piece used to connect the separation capillary to the sample flow through system. Two other layouts are shown in FIG. 25. FIG. 26 shows the separations achieved using the three T-piece orientations described above.

Figure 27:
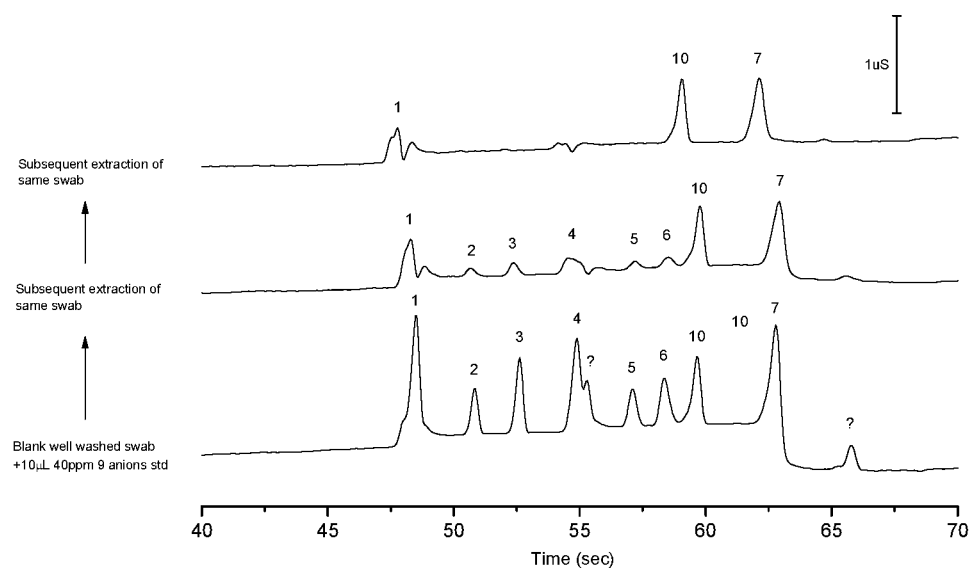
FIG. 27 is a comparison of electropherograms showing the cleardown following Scantex analysis of swab spiked with 10 μL of 40 ppm standard using T-piece orientation shown in FIG. 25B. BGE: 50 mM Tris/CHES+0.06% PEI, Capillary: 25 μm×50 cm (36.5 cm to detector) HDMB/PSS/HDMB coated, Voltage: 40 kV, Injection: FES pressure with solenoid shut for 4 sec. Capillary flushed between runs.
Figure 28:
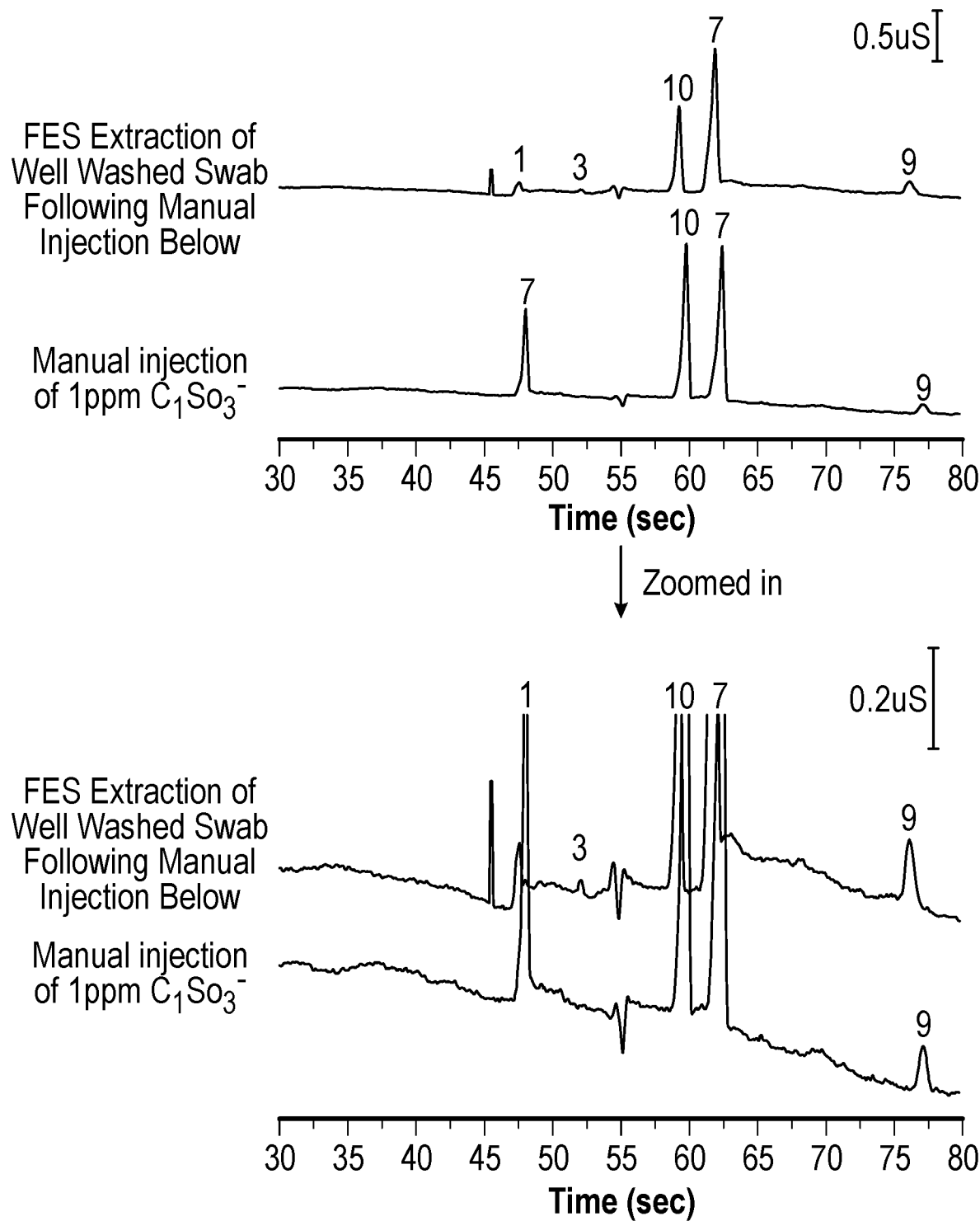
FIG. 28 is a comparison of electropherograms showing the FES carryover following a positive analysis. BGE: 50 mM Tris/CHES+0.06% PEI, Capillary: 25 μm×50 cm (36.5 cm to detector) HDMB/PSS/HDMB coated, Voltage: 40 kV, Injection: Manual injection or FES pressure with solenoid shut for 5 sec. Capillary flushed between runs.

FIG. 27 shows the cleardown following the analysis of a swab spiked with 10 μL of 40 ppm standard using the T-piece configuration shown in FIG. 25B.

3.4 Capillary Installation

Figure 29:
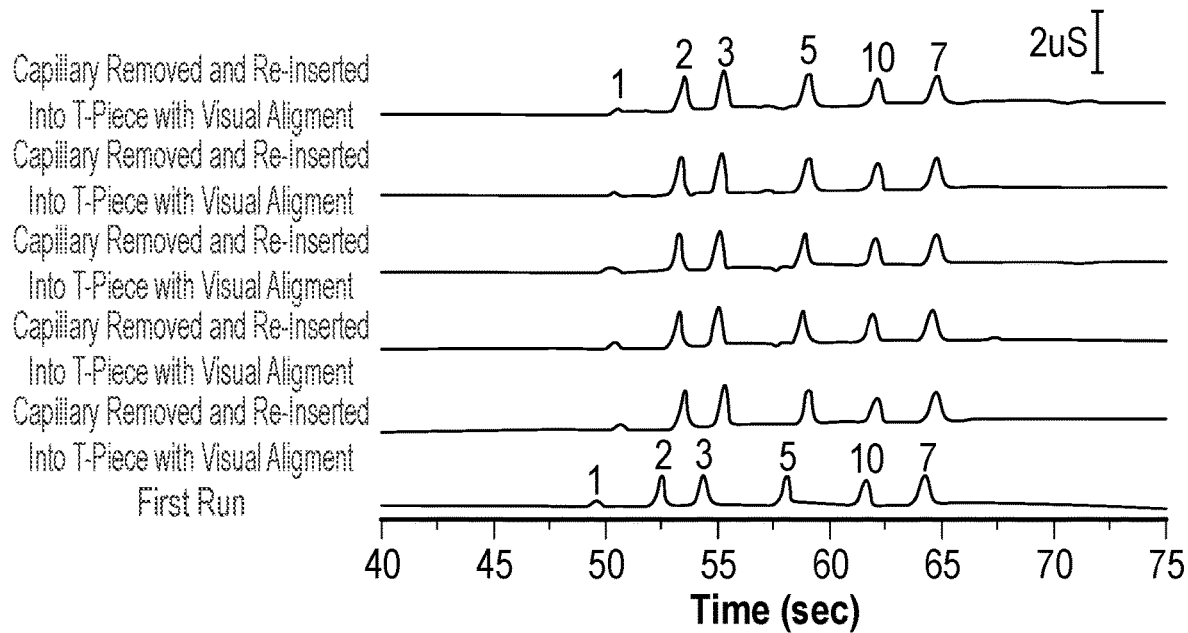
FIG. 29 is a comparison of electropherograms showing the reproducibility of capillary installation within the Scantex In-BES. BGE: 50 mM Tris/CHES+0.055% PEI, Capillary: 25 μm×50 cm (36.5 cm to detector) HDMB/PSS/HDMB coated, Voltage: 40 kV, Injection: FES pressure with solenoid shut for 5 sec. Capillary flushed between runs. Sample anions at 1 ppm.

The effect that different methods of capillary installation has on the separation results was investigated, and the results are shown in FIG. 29. Cartridges containing the capillary need to allow for the capillary to be located correctly when inserted into the device, to allow for reproducible separations.

4. Performance

4.1 Linearity

Figure 30:
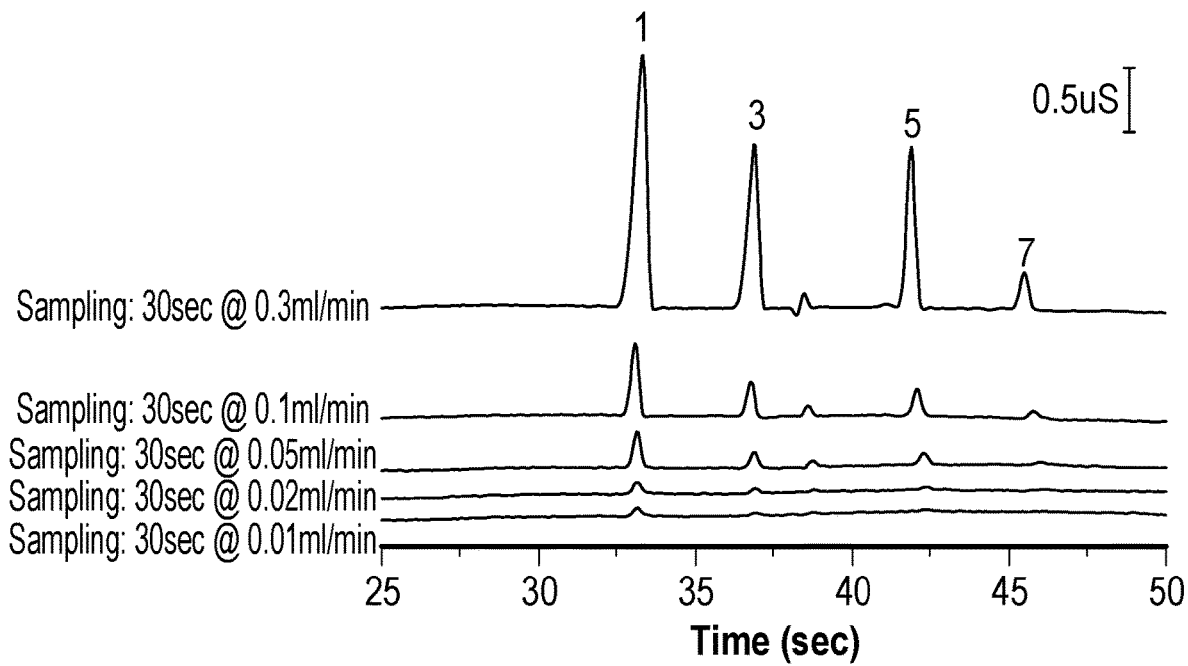
FIG. 30 is a comparison of electropherograms showing the effect of sample flow rate on Scantex In-BES separations. BGE: 50 mM Tris/CHES+0.06% PEI, Capillary: 25 μm×40 cm (26.5 cm to detector) HDMB/PSS/HDMB coated, Voltage: 45 kV, Injection as labelled. Capillary flushed between runs. Sample anions at 1 ppm.
Figure 31:
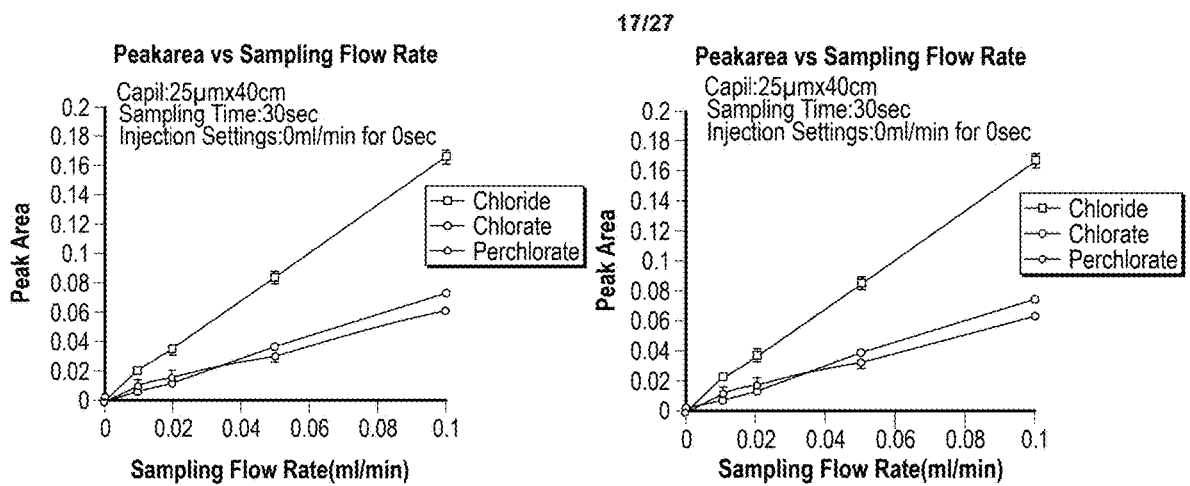
FIG. 31 is a graph showing the effect on peak area and peak height of varying sample flow rate using the Scantex In-BES. Conditions as in FIG. 30.

FIG. 30 and FIG. 31 show the effect on the separation of varying sample flow rate.

4.2 Reproducibility

Figure 32:
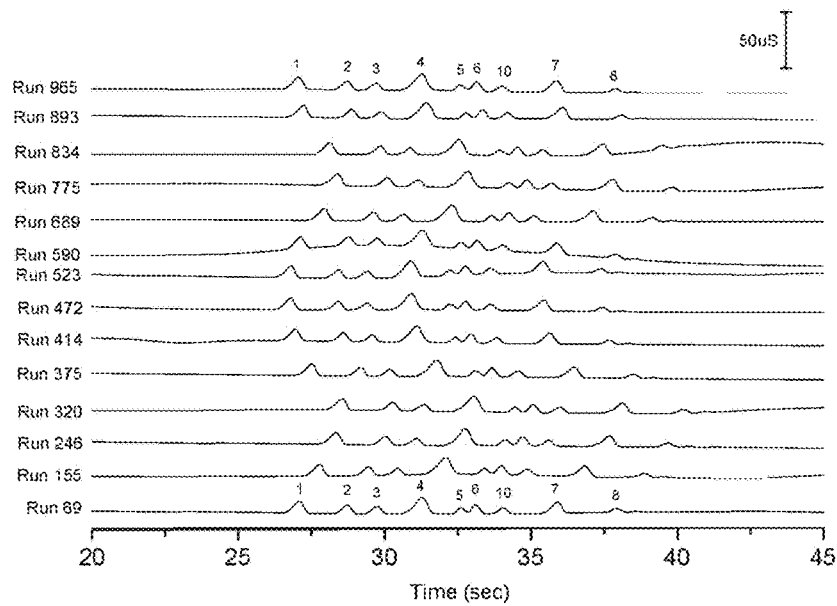
FIG. 32 is a comparison of electropherograms showing the reproducibility of the Scantex In-BES over 965 consecutive runs without temperature control. BGE: 50 mM Tris/CHES+0.06% PEI, Capillary: 25 μm×40 cm (26.5 cm to detector) HDMB/PSS/HDMB coated, Voltage: 45 kV, Injection 0 µL/sec for 0 sec. Capillary flushed between runs. Sample anions at 0.5 ppm except methanesulfonate and propanesulfonate at 1 ppm.
Figure 33:
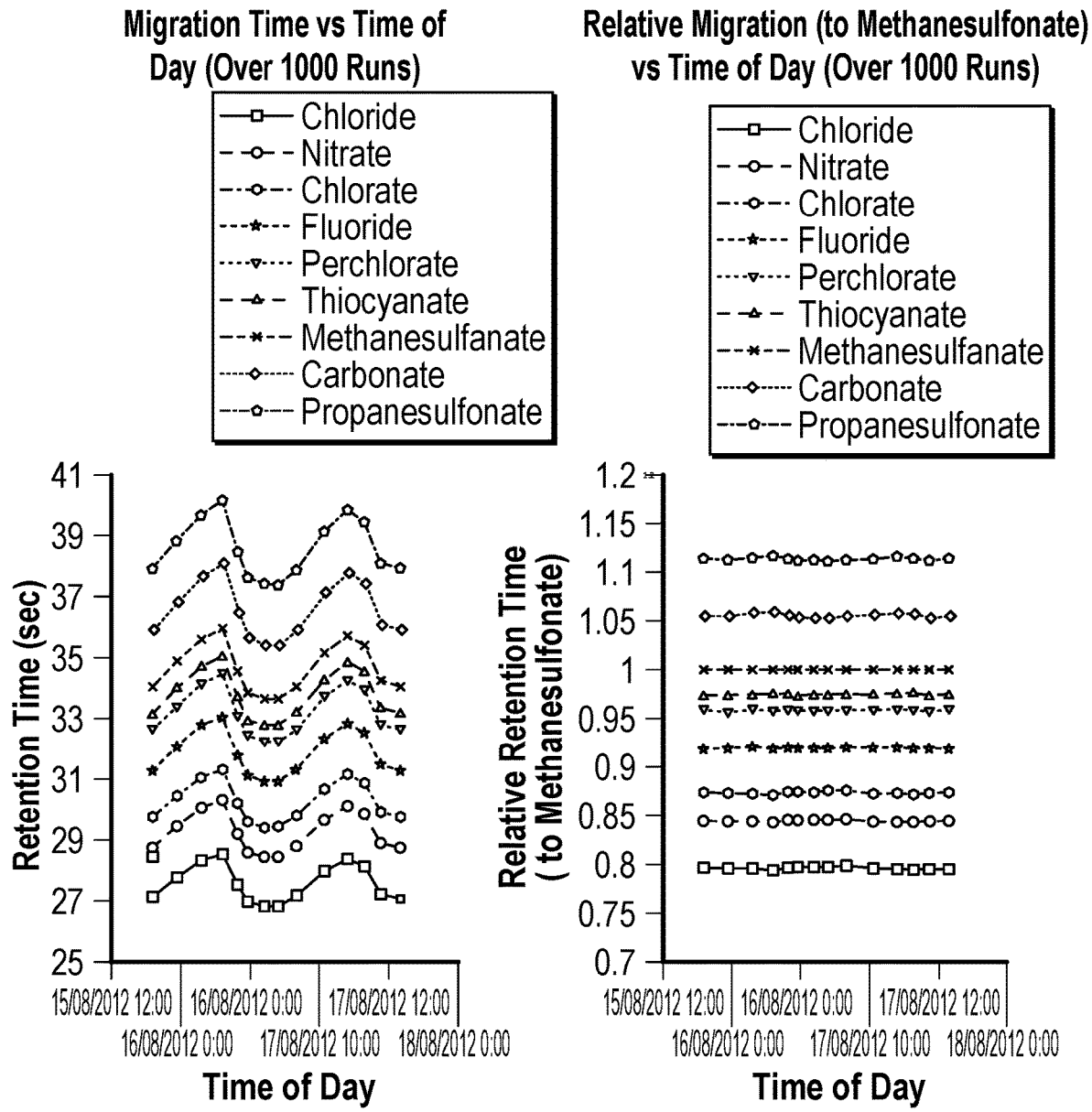
FIG. 33 is a graph showing the migration times and relative migration times for the separations shown in FIG. 32.

FIG. 32 shows the long term reproducibility of the system and method, while the migration times and relative migrations times are shown in FIG. 33. These runs were performed without temperature control and the resultant effect on migration time over the course of a 24 hr period can be clearly seen. While absolute migration time is affected by changing temperature, migration times relative to methanesulfonate (the IS) are very stable with RSD of <0.20% over the 1000 consecutive runs. As well as the stability in relative migration times, resolution between adjacent peaks was also maintained over the course of all 1000 runs (resolution RSD of 3.5% for the worst resolved peaks of perchlorate and thiocyanate).

In FIG. 33 it is shown that the use of relative migration times can improve the reproducibility of the system significantly. The use of a temperature controlled environment can to further mitigate against variations brought about by temperature fluctuations.

Figure 34:
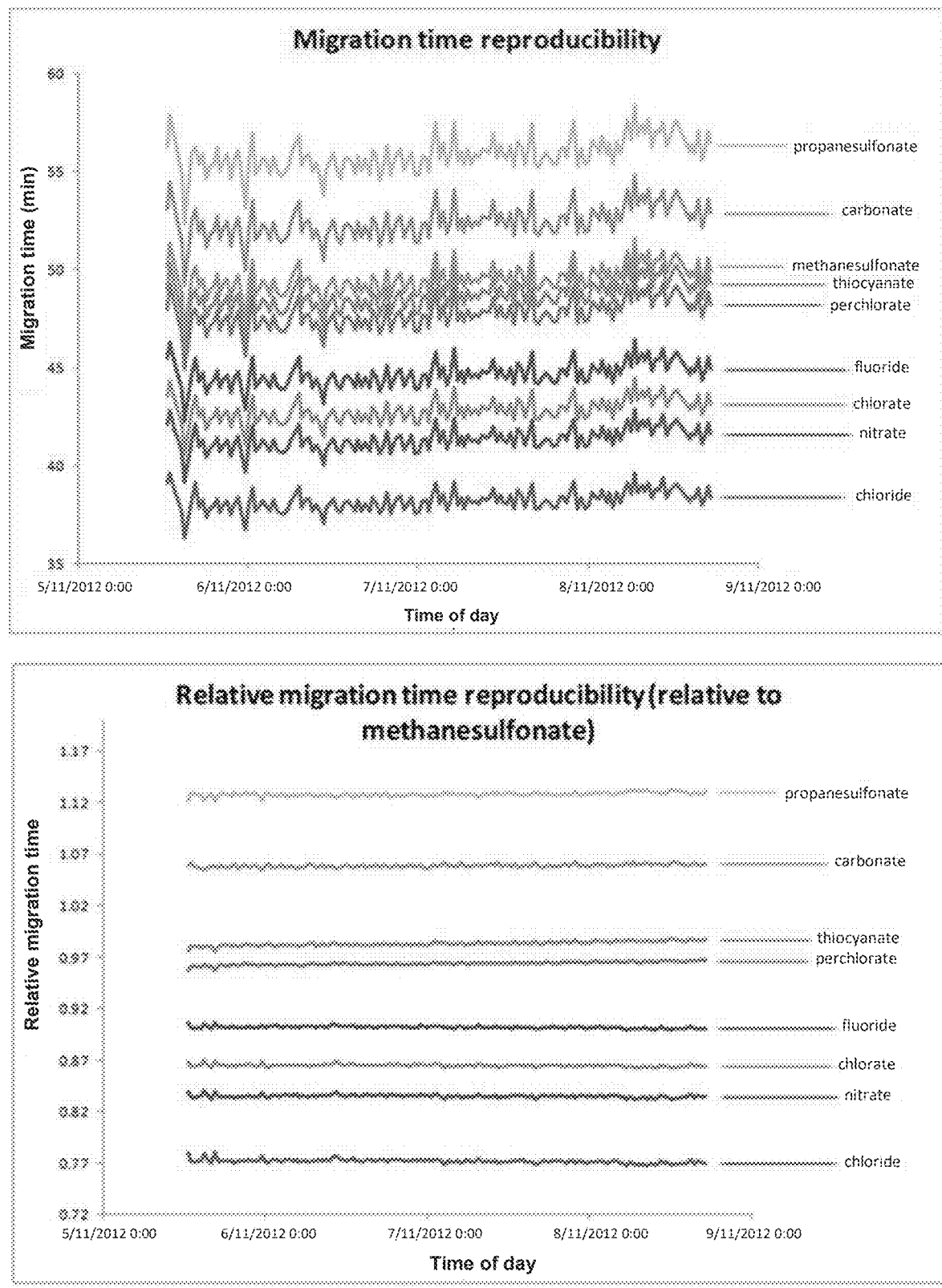
FIG. 34 is a graph showing the migration times and relative migration times over 1875 consecutive analysis using the temperature controlled housing. Other conditions are as in FIG. 32 apart from separation voltage which was 25 kV.

FIG. 34 shows the migration times and relative migration times obtained when using a temperature controlled housing.

Figure 35:
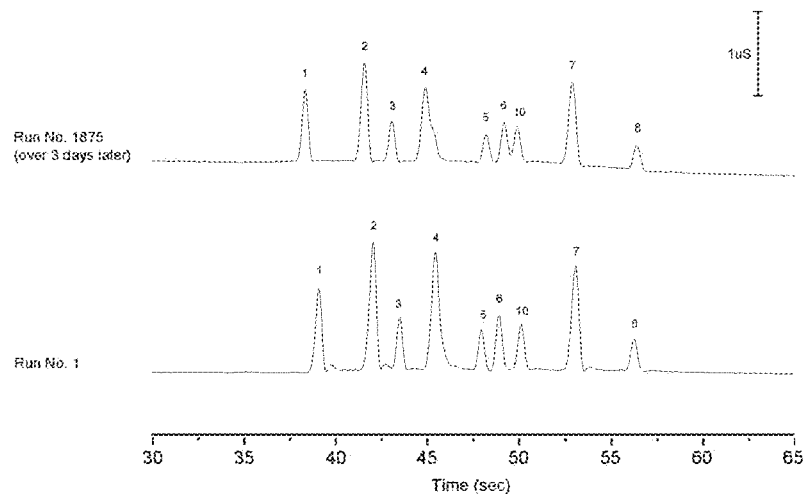
FIG. 35 is a comparison of electropherograms showing the first and last run during reproducibility studies of the Scantex In-BES using the temperature controlled housing. BGE: 50 mM Tris/CHES+0.06% PEI, Capillary: 25 µm×40 cm (26.5 cm to detector) HDMB/PSS/HDMB coated, Voltage: 25 kV, Injection 0 µL/sec for 0 sec. Capillary flushed between runs. Sample anions are at 0.5 ppm except for methanesulfonate and propanesulfonate which are at 1 ppm.

FIG. 35 shows the first and last runs from the long term reproducibility study shown in FIG. 35. Excellent agreement between the two runs can be seen with only minor loss in resolution between the more closely migrating anions (perchorate, thiocyanate and methanesulfonate). Furthermore, while this series of runs was performed in a temperature controlled environment, no other specific care was taken when running the system with the same BGE used in both the inlet and outlet positions for all analyses. As well as resolution it can also be seen that the peak area and heights were relatively unaffected over the course of the 1875 consecutive runs.

4.3 Background Interferences

Application of the system to real world samples was tested by screening a range of everyday chemicals, foods and materials using the Scantex system to determine if any potential masking agents were present. If possible the materials were tested in a manner that best matched how they may be used in practice.

Figure 36:
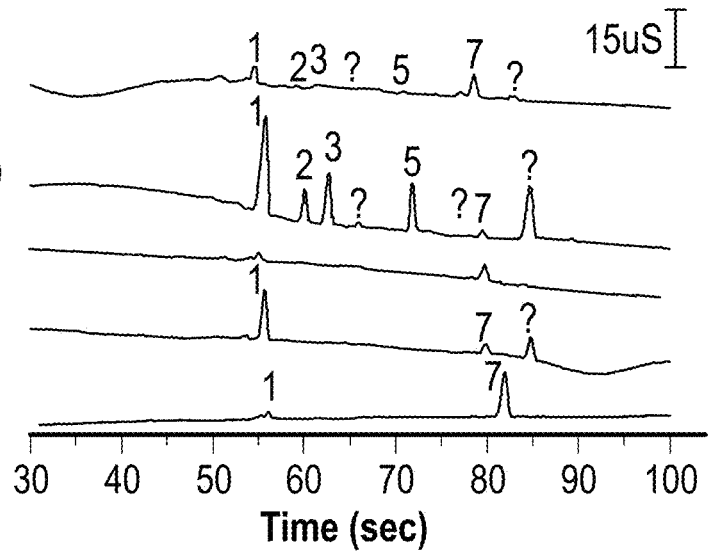
FIG. 36 is a comparison of electropherograms showing the analysis of a hand swab and subsequent extractions. BGE: 50 mM Tris/CHES+0.06% PEI, Capillary: 25 µm×40 cm (26.5 cm to detector) HDMB/PSS/HDMB coated, Voltage: 25 kV, Injection solenoid shut for 0 sec. Capillary flushed between runs. Peaks are; 1=chloride and 7=carbonate.

FIG. 36 shows the analysis result from the swab of a hand as well as the subsequent extraction of the same swab following a wash sequence consisting of four rinses (lower three traces). The main component observed when taking swabs of skin is chloride which can clearly be seen in FIG. 36. A swab taken of the skin and then spiked with a 100 ppm target anion standard was also analysed showing the three target peaks well resolved from the chloride and the unknown peak migrating after carbonate. It is not clear what this unknown peak is but it is commonly present when taking swabs of skin, however, since it migrates after the carbonate peak and well away from any of the target compounds identification of this peak was not deemed important.

Figure 37:
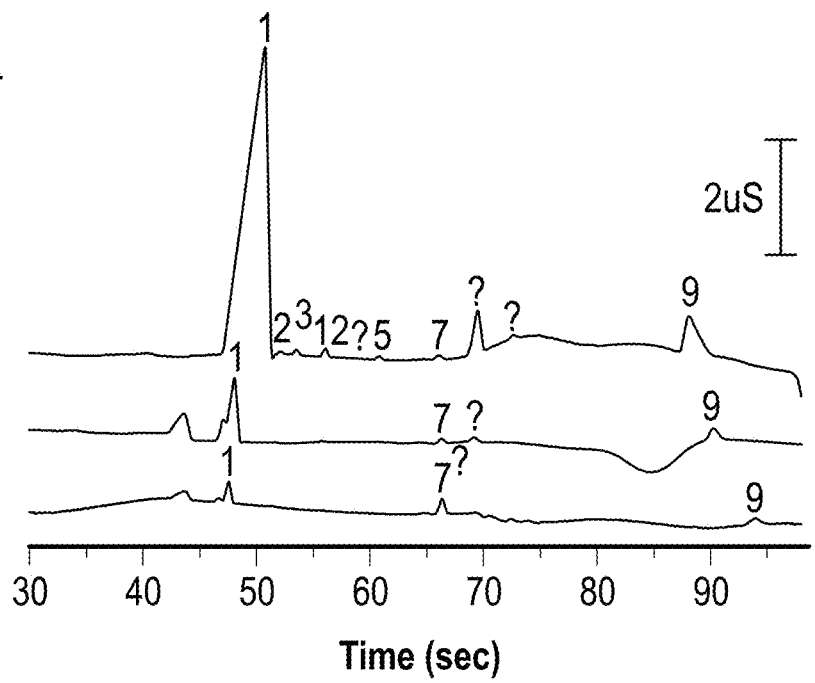
FIG. 37 is a comparison of electropherograms showing the analysis of a swab taken from skin recently exposed to seawater. BGE: 50 mM Tris/CHES+0.06% PEI, Capillary: 25 µm×40 cm (26.5 cm to detector) HDMB/PSS/HDMB coated, Voltage: 25 kV, Injection solenoid shut for 0 sec. Capillary flushed between runs.

Since chloride is likely to be a major contaminant in the analysis of real samples the effect of swabbing skin recently exposed to seawater was tested (FIG. 37). As expected a very large chloride peak is observed, and while this peak does have an effect on the migration time of nitrate and chlorate, pushing the migration time for both out by a few seconds, the two peaks are still clearly visible.

Figure 38:
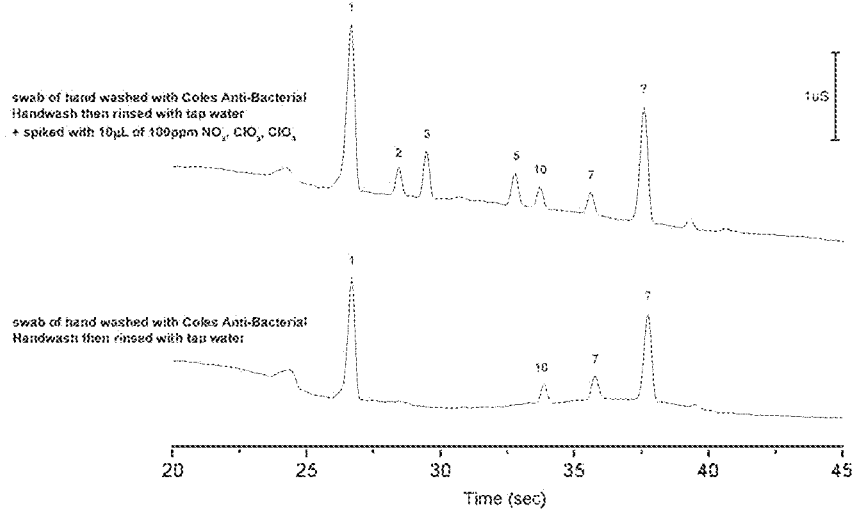
FIG. 38 is a comparison of electropherograms showing the swab of hand washed with Coles Anti-Bacterial Handwash. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.
Figure 39:
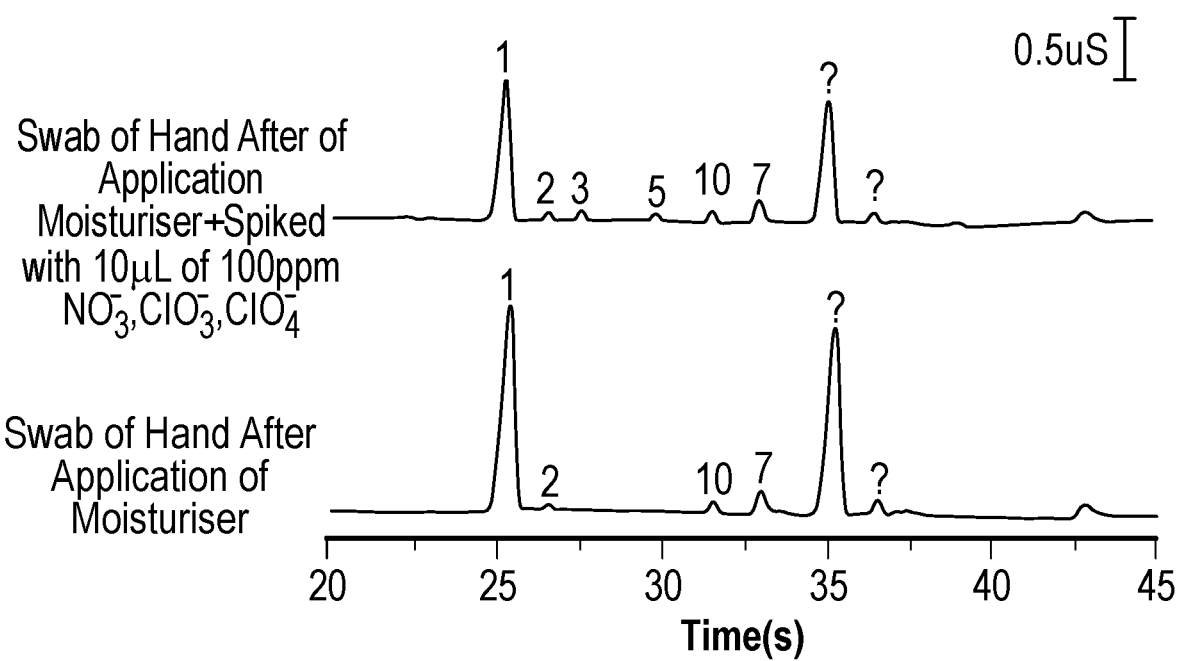
FIG. 39 is a comparison of electropherograms showing the swab of hand after application of Redwin Sorbolene Moisturiser. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.
Figure 40:
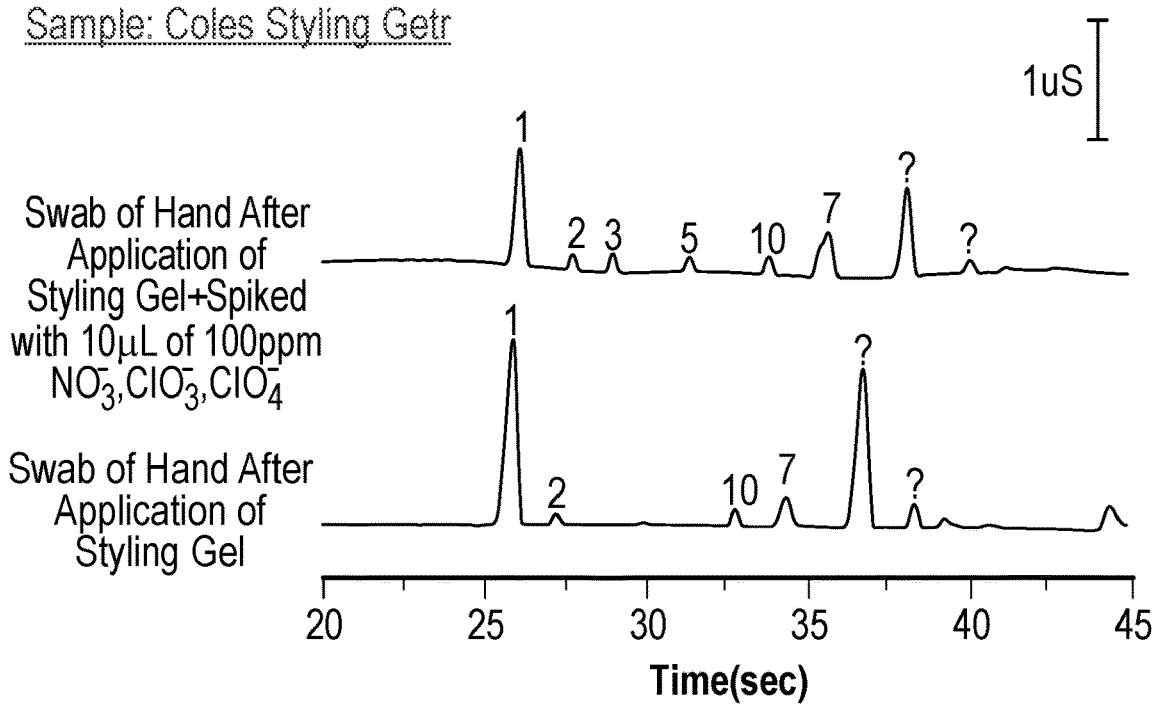
FIG. 40 is a comparison of electropherograms showing the swab of hand after using Coles Styling Gel. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.
Figure 41:
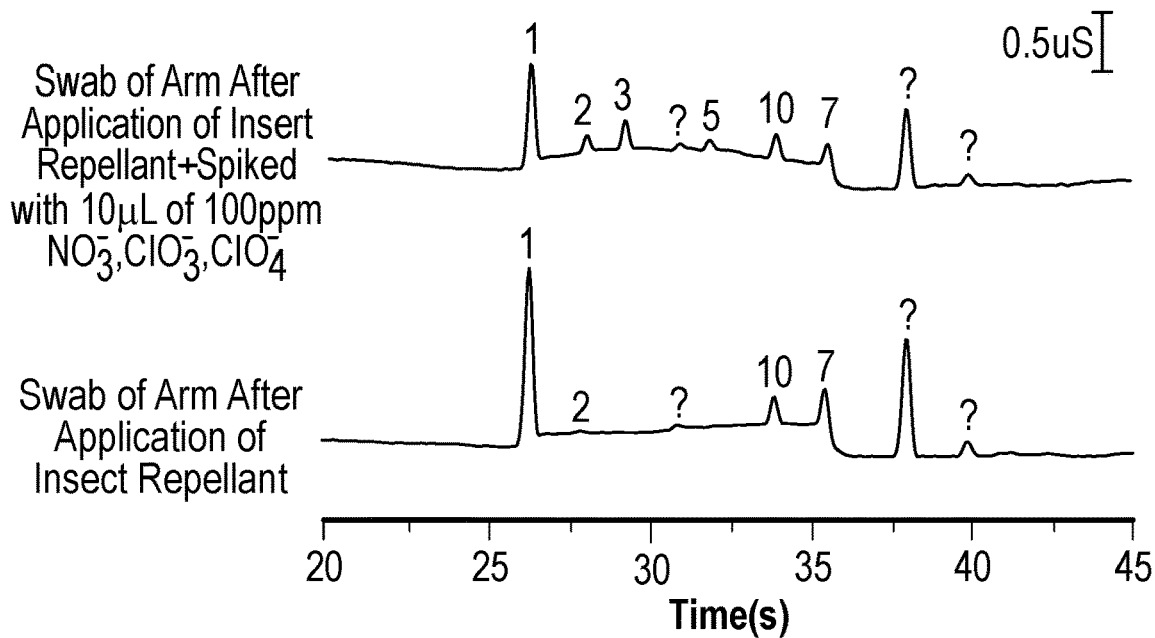
FIG. 41 is a comparison of electropherograms showing the swab of hand after using Aerogard Tropical Strength Insect Repellent. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.

FIGS. 38 to 46 show the analysis of a range of potential real world contaminants. Each product was either handled or directly applied to the hand following which a swab was taken and directly analysed using the Scantex system. Sampling was performed as follows:

- In FIG. 38 the hand was washed using the anti-bacterial handwash and rinsed. A swab was then taken and either directly analysed or spiked with 10 μL of 100 ppm target anion standard applied directly to the swab and then analysed by the Scantex system.
- In FIG. 39 the moisturiser was applied to the hand and a swab taken. The swab was then either directly analysed or spiked with 10 μL of 100 ppm target anion standard applied directly to the swab and then analysed by the Scantex system.
- In FIG. 40 the styling gel was applied to the hand as if about to be used and a swab taken. The swab was then either directly analysed or spiked with 10 μL of 100 ppm target anion standard applied directly to the swab and then analysed by the Scantex system.
- In FIG. 41 the insect repellant was applied to the hand and a swab taken. The swab was then either directly analysed or spiked with 10 µL of 100 ppm target anion standard applied directly to the swab and then analysed by the Scantex system.

Figure 42:
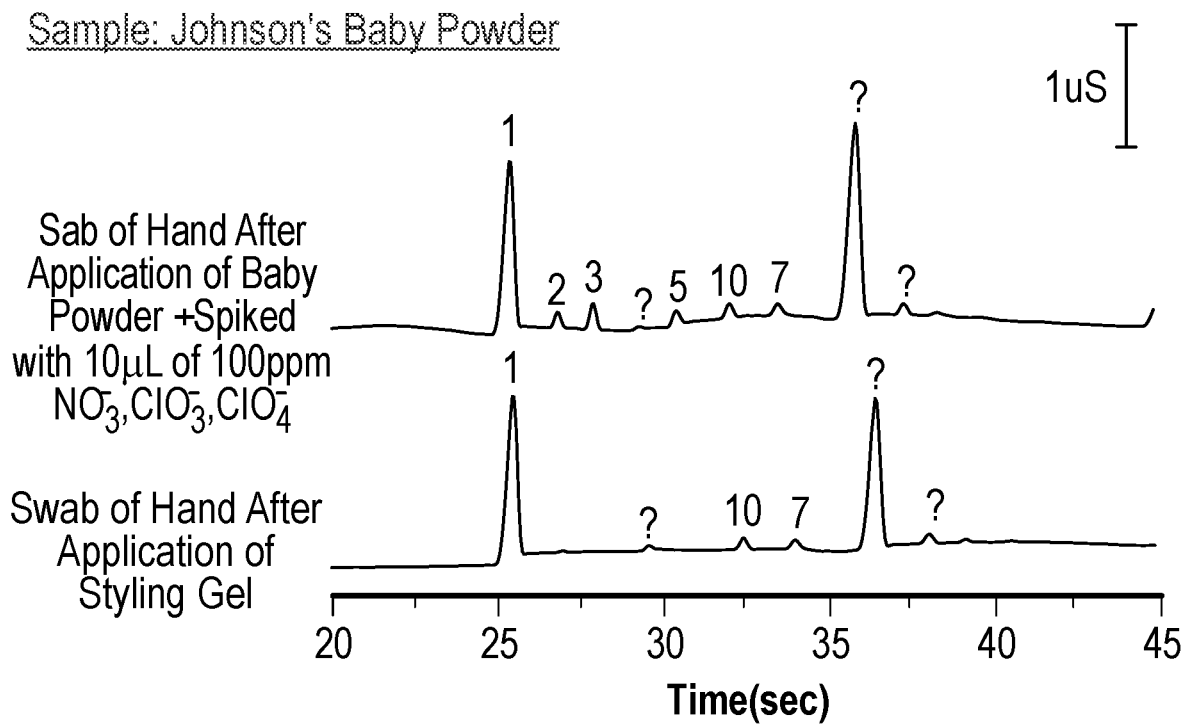
FIG. 42 is a comparison of electropherograms showing the swab of hand after using Johnson's Baby Powder. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.

In FIG. 42 the baby powder was applied to the hand, dusted off and a swab taken. The swab was then either directly analysed or spiked with 10 µL of 100 ppm target anion standard applied directly to the swab and then analysed by the Scantex system.

Figure 43:
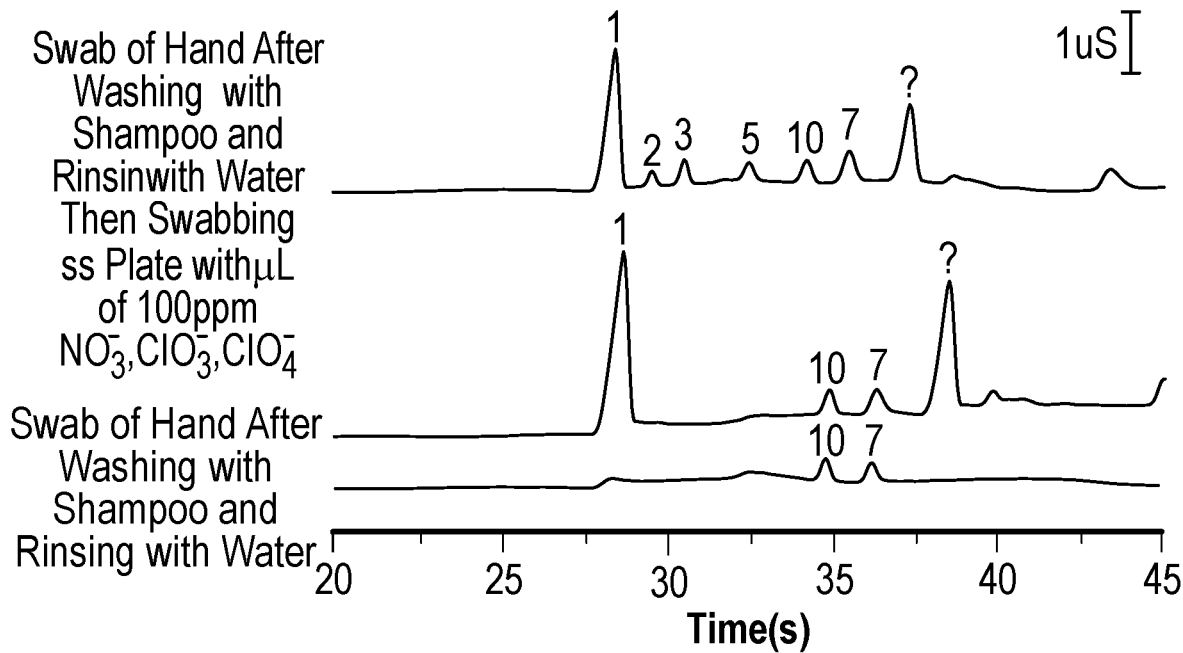
FIG. 43 is a comparison of electropherograms showing the swab of hand after using Organic Care Conditioning Shampoo. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.

In FIG. 43 the shampoo was applied to the hand as if about to be used and a swab taken. The swab was then either directly analysed or spiked with 10 µL of 100 ppm target anion standard applied directly to the swab and then analysed by the Scantex system.

Figure 44:
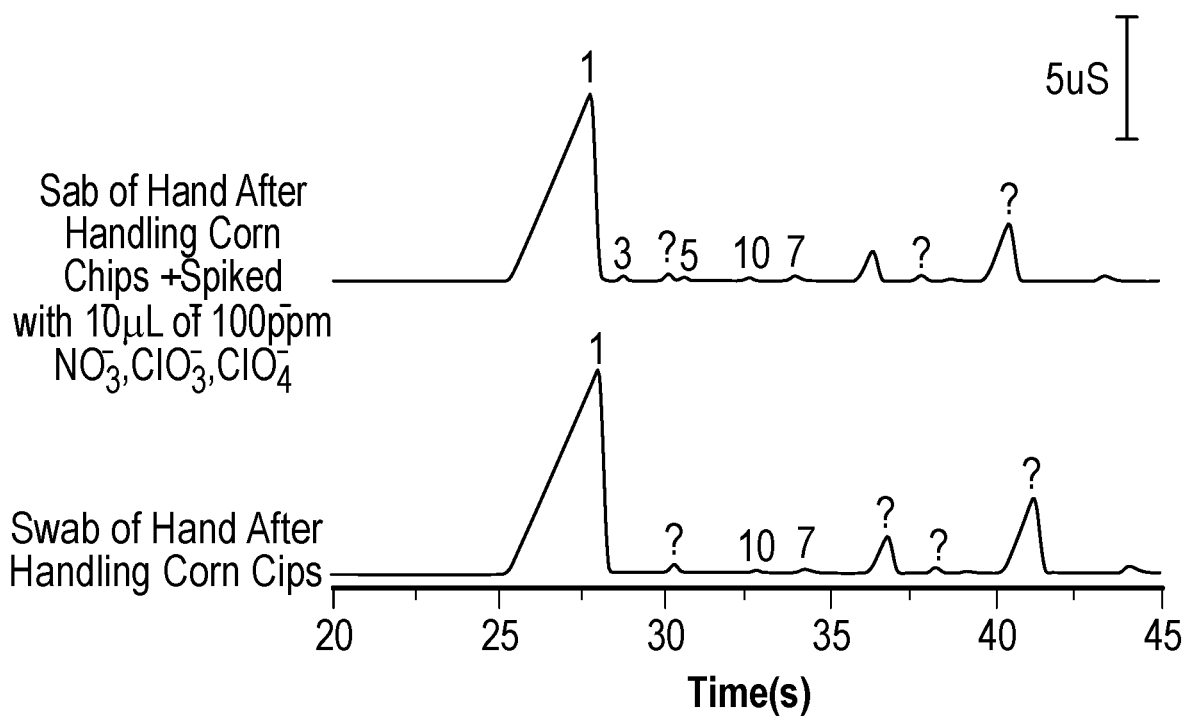
FIG. 44 is a comparison of electropherograms showing the swab of hand after handling CC's Cheese Supreme Corn Chips. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.
Figure 45:
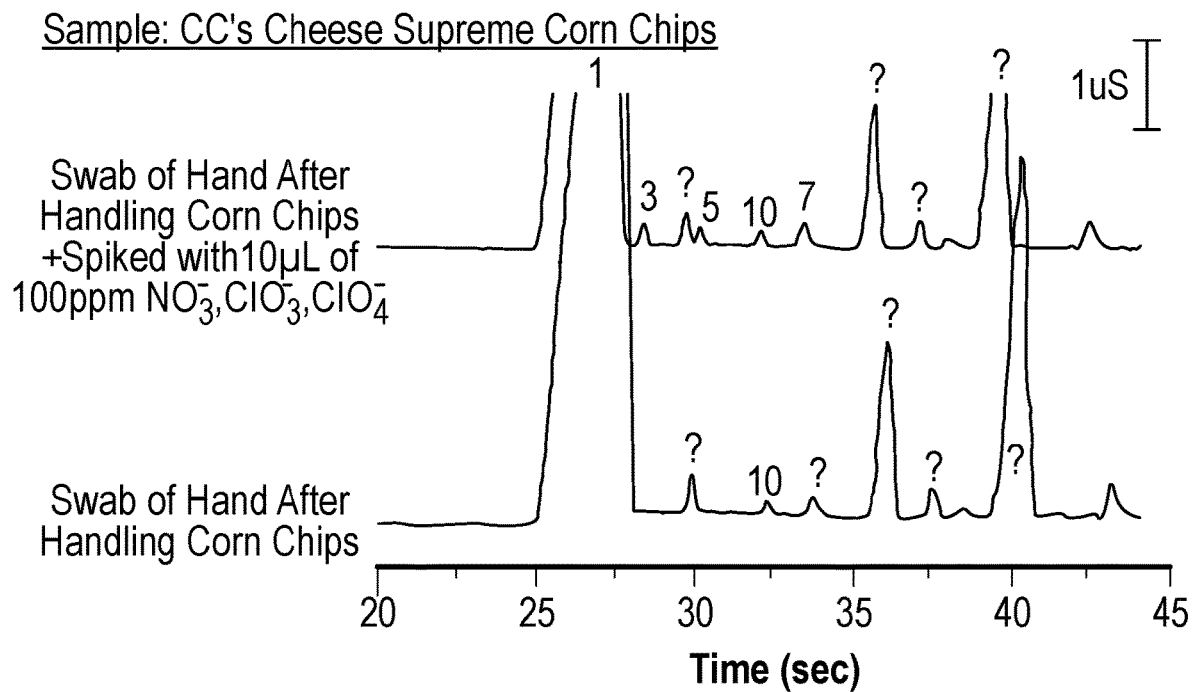
FIG. 45 is an enlarged view of the comparison of electropherograms shown in FIG. 44.

In FIG. 44 the corn chips were handled thoroughly as if being eaten after which a swab of the hand was taken. The swab was then either directly analysed or spiked with 10 µL of 100 ppm target anion standard applied directly to the swab and then analysed by the Scantex system.

Figure 46:
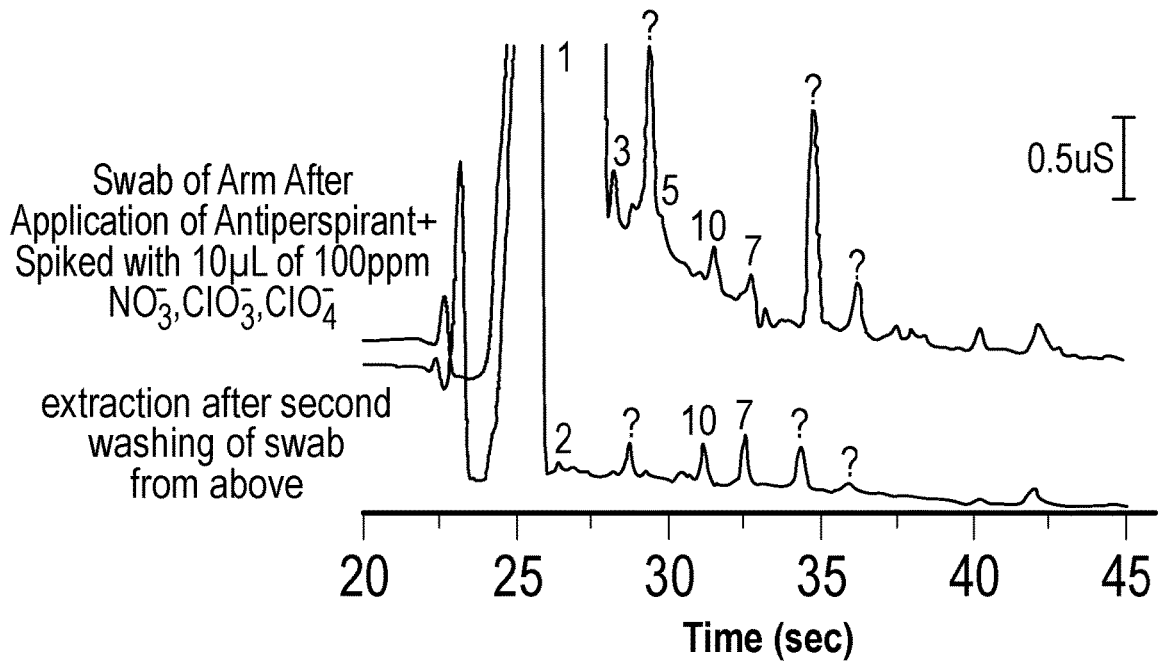
FIG. 46 is a comparison of electropherograms showing the swab of hand after application of Coles Roll-on Antiperspirant. 1 ppm Internal standard (methanesulfonate) directly added to extraction solution BGE: 50 mM Tris/CHES+0.06% PEI, Capillary: 25 µm×40 cm (26.5 cm to detector) HDMB/PSS/HDMB coated, Voltage: 40 kV, Injection solenoid shut for 0 sec. Capillary flushed between runs.

In FIG. 46 the antiperspirant was applied directly to the hand and a swab taken. The swab was then either directly analysed or spiked with 10 µL of 100 ppm target anion standard applied directly to the swab and then analysed by the Scantex system.

5. Field Analysis

The system was evaluated to various extents on three separate occasions. The first test was conducted in Location A, and involved the Front End System (FES) for sample extraction coupled with the Scantex SI-CE (also referred to as the Inorganic-Back End System or "In-BES"). The other two instances occurred within a University campus (Locations B and C) and involved testing of the complete system including the FES and In-BES.

5.1 Range Testing at Location A

Direct analysis of individuals and samples exposed to IED preparation and detonation was undertaken at a location where explosive detonation exercises were being conducted.

Figure 47:
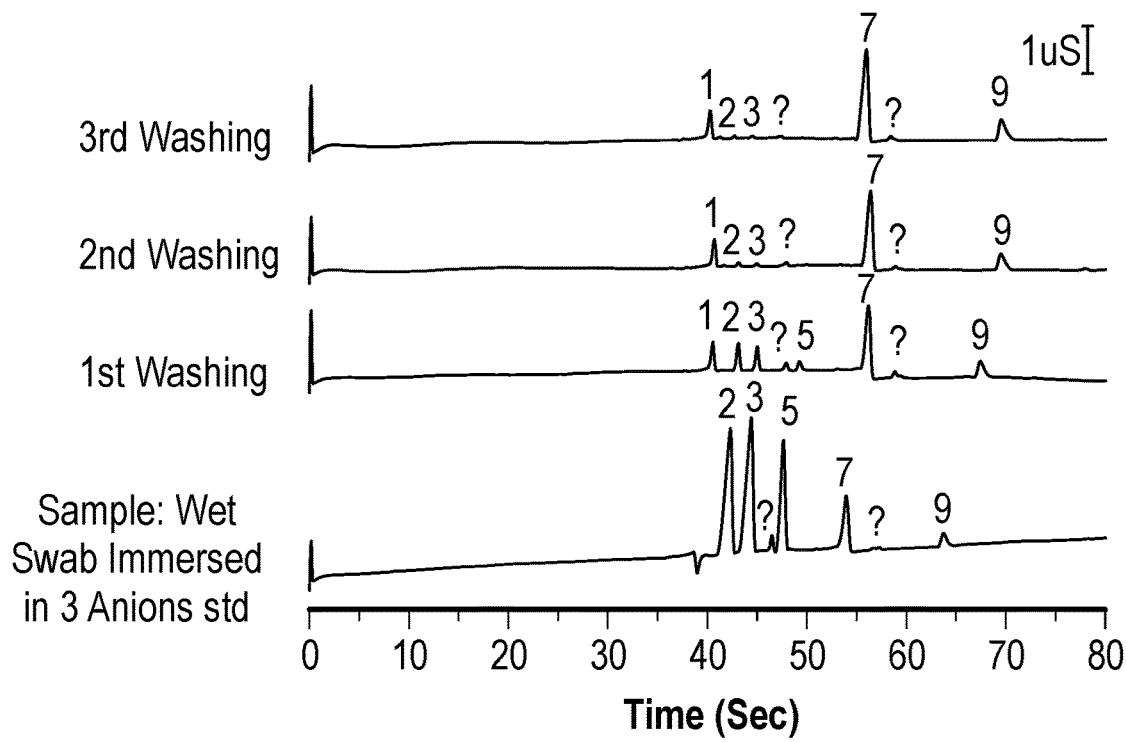
FIG. 47 is a comparison of electropherograms showing the analysis of swab spiked with target anion standard during range day exercise and subsequent analysis of the same swab following washing. Instrumental setup was modified from subsequent iterations of the Scantex system: the switching valve used to divert sample or BGE to the SI-CE T-piece was replaced with a simple T-piece. This layout functions in the same manner as the final Scantex In-BES except that flushing of the FES and BES can only take place once the separation has been completed. Sampling: Swab was immersed in 100 ppm target anion standard before being inserted into the Scantex system. BGE: 50 mM Tris/CHES+0.06% PEI, Capillary: 25 µm×40 cm (26.5 cm to detector) HDMB/PSS/HDMB coated, Voltage: 25 kV, Injection solenoid shut for 0 sec. Capillary flushed between runs.

FIG. 47 shows analysis of a spiked swab sample using the modified system present at Location A. It can be seen that good detection of the target species (nitrate, chlorate, perchlorate) was obtained. Furthermore subsequent analysis of the same swab showed effective cleaning of the FES and In-BES such that after three washings of the swab the majority of the target residue was removed.

Figure 48:
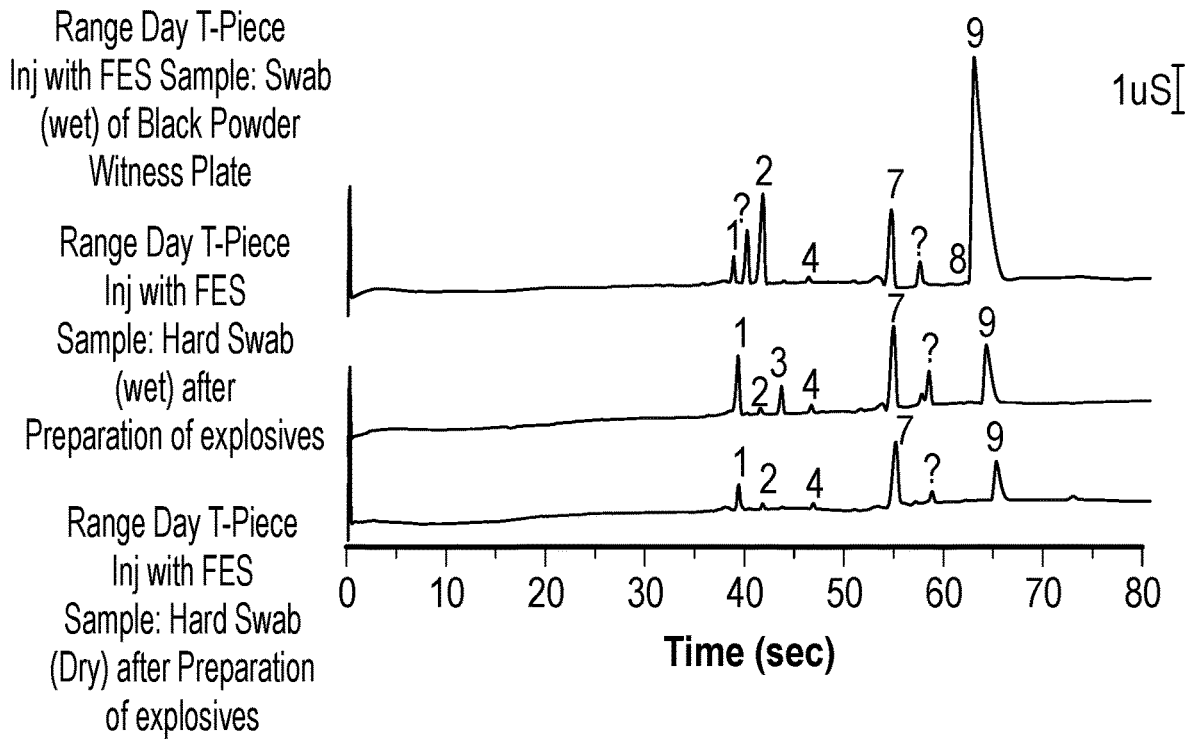
FIG. 48 is a comparison of electropherograms showing the analysis of samples taken at a range. Sampling: A wet and a dry swab was wiped across the hand of one of the individuals at the range following preparation of the IEDs. Another wet swab was wiped across a witness plate following the detonation of a black powder based IED. All swabs were bagged and brought back to the mobile laboratory where the Scantex system was located and analysed on site. BGE: 50 mM Tris/CHES+0.06% PEI, Capillary: 25 µm×40 cm (26.5 cm to detector) HDMB/PSS/HDMB coated, Voltage: 25 kV, Injection solenoid shut for 0 sec. Capillary flushed between runs.

FIG. 48 shows both wet and dry swab analysis of the hands of a bomb technician following preparation of the IEDs used as well as a swab sample taken from one of the witness plates used with a black powder based IED. It can be seen that while no target residues were picked up when using a dry swab, the wet swab of the bomb technicians hand did pick up traces of chlorate, presumably used during preparation of one of the IEDs.

As would be expected the wet swab of the black powder IED witness plate shows a large signal for nitrate highlighting the potential for application of the Scantex system to post-blast analysis as well as pre-blast screening.

Results from the Location A tests showed that the system is capable of detecting target species such as chlorate on persons who have been involved in the preparation of IEDs. Furthermore while background levels of nitrate were detected during the Location A tests (as was observed in the Location B and C tests), elevated levels were seen when swab samples were taken from a witness plate exposed to a black powder based device.

5.2 Testing at Locations B and C

Screening of individuals from the general population at Locations B and C was undertaken using the Scantex system over two separate days and at two different locations (Locations B and C). Individuals were invited to submit themselves for a "random" screening which involved a wet swab of their clothing and shoes and subsequent analysis by the Scantex system. The analysis results were run on the spot.

5.2.1 Testing at Location B 5.2.1.1 In-BES Results

Figure 49:
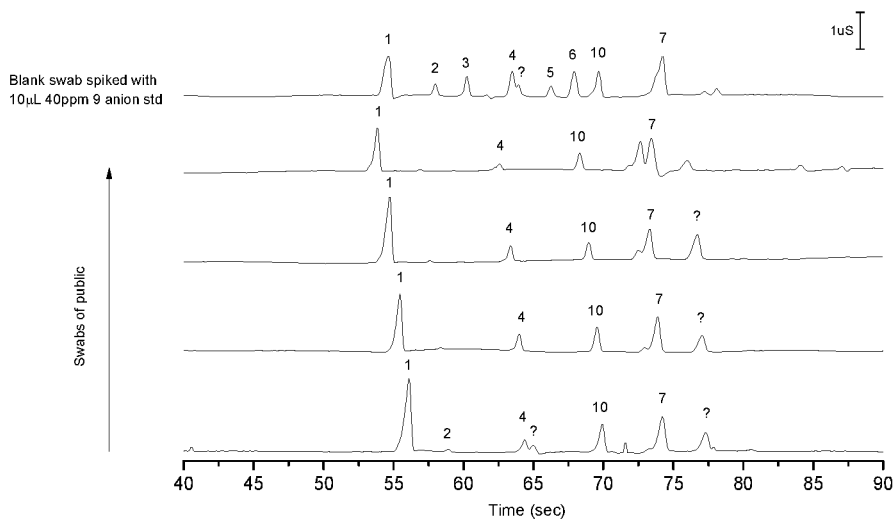
FIG. 49 is a comparison of electropherograms showing the selected screening results from the testing of volunteers from the general population. A single swab sample was taken from each volunteer with the swab being passed over the volunteers hand, their trouser leg and the top of their shoes. A new swab wetted with Milli-Q water was used for each analysis. The top trace was obtained using a blank swab spiked with 10 µL of 40 ppm standard. BGE: 50 mM Tris/CHES+0.06% PEI, Capillary: 25 µm×50 cm (36.5 cm to detector) HDMB/PSS/HDMB coated, Voltage: 40 kV, Injection solenoid shut for 4 sec. T-piece configuration as in FIG. 34B. Capillary flushed between runs.

FIG. 49 shows some selected screening results from first day of the Location B field test. The system worked without problem.

FIG. 49 shows the screening results from four of the individuals. Each test was performed using a new swab wetted with Milli-Q water. From the results it can be seen that very similar levels of the common background ions chloride, carbonate, and to a lesser extent fluoride, are observed, though the fluoride peak is likely to result from either the swab itself or contamination in the water used to wet the swab. Background levels of nitrate are also observed in most of the samples, however, these levels are low and relatively consistent such that it should be possible, for routine screening purposes, to put a threshold limit in place and only return a "positive" results if the threshold level is breached. As expected no chlorate or perchlorate was detected in any of the samples.

5.2.2 Testing at Location C 5.2.2.1 In-BES Results

Figure 50:
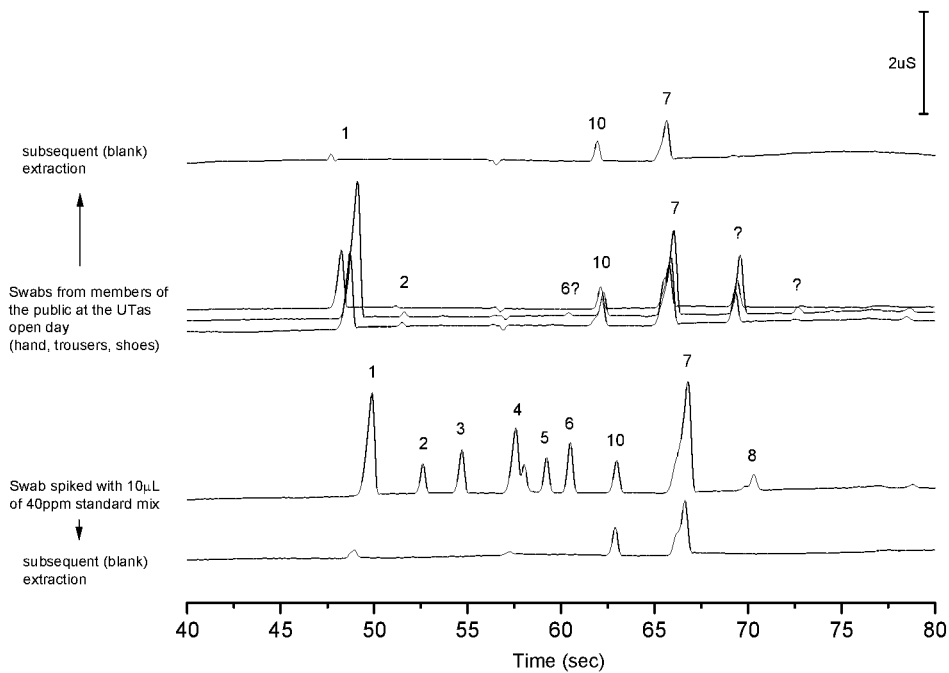
FIG. 50 is a comparison of electropherograms showing the selected screening results from the testing of volunteers from the general population on a different day and location to that referred to for FIG. 49. A single swab sample was taken from each volunteer with the swab being passed over the volunteers hand, their trouser leg and the top of their shoes. A single swab was used for all tests rather than replacing with a new swab each analysis. The spiked sample was obtained by adding 10 µL of 40 ppm standard to the swab and then analysing. BGE: 50 mM Tris/CHES+0.06% PEI, Capillary: 25 µm×50 cm (36.5 cm to detector) HDMB/PSS/HDMB coated, Voltage: 40 kV, Injection solenoid shut for 4 sec. T-piece configuration as in FIG. 34B. Capillary flushed between runs.

FIG. 50 shows a selection of screening results from the testing performed at Location C. The conditions and protocols used were similar to the previous field test, however, a single swab was used for all analyses. From the results it can be seen that the common background species of chloride, carbonate and the unknown species following carbonate are again present in all samples, though the levels of these, especially chloride, vary from individual to individual. Nitrate was again observed in many of the samples, though as with the previous field test, the observed levels were relatively low ranging from ~15 pg to 75 pg by mass (calculated based on peak heights as shown in FIG. 50). No chlorate or perchlorate was seen in any of the samples.

FIG. 50 also shows subsequent analysis results following both an actual screening sample as well as a spiked blank swab. In both cases it can be seen that negligible carryover was observed suggesting that the flushing protocol used between screens was sufficient to fully clean the swab ready for each new analysis.

5.3 Conclusions from Field Tests at Locations B and C

The Scantex system performed very well in all three field tests with no instrumental issues encountered.

The preliminary background analysis results from the Location B and C field tests show that standard background levels of interfering species such as chloride and carbonate do not interfere with the target species nitrate, chlorate and perchlorate. It was also found that additional background species not initially considered do not pose any problems for the analysis of the target species. The level of interfering species was found to be relatively consistent over all volunteers tested during the Location B and C field tests. Of the target species only nitrate was detected in the general population, however its levels were relatively low and as such a minimum threshold could easily be set when applying the screening procedure to real world analysis.

6. Conclusions and Outcomes

The above Results and Discussion outline the development and testing of a prototype explosive residue screening device capable of testing for the presence of target species indicative of both inorganic and peroxide based explosive devices.

The system is capable of reproducibly analysing swab samples for the presence of both inorganic explosive based residues (nitrate, chlorate, perchlorate) in a time frame of 1 minute. Flexibility has been left in the system such that the analysis time required to screen for the inorganic residues can be easily tuned for the particular application.

The main features of the Scantex system are as follows:

provides a means to simply analyse any surface for the presence of inorganic based explosive residues.

screening time is currently in the order of 1-2 min but can be reduced relatively simply.

the system is easily controlled using computer software.

analysis results are displayed on the computer in real time.

reagent use by the FES and In-BES has been minimised with the FES using ~4 ml of solution (predominantly water) per analysis, the In-BES using ~0.3 ml of solution per analysis.

reproducibility of the system is very good allowing for extended periods of continual operation.

6.1 Final System Parameters

Figure 51:
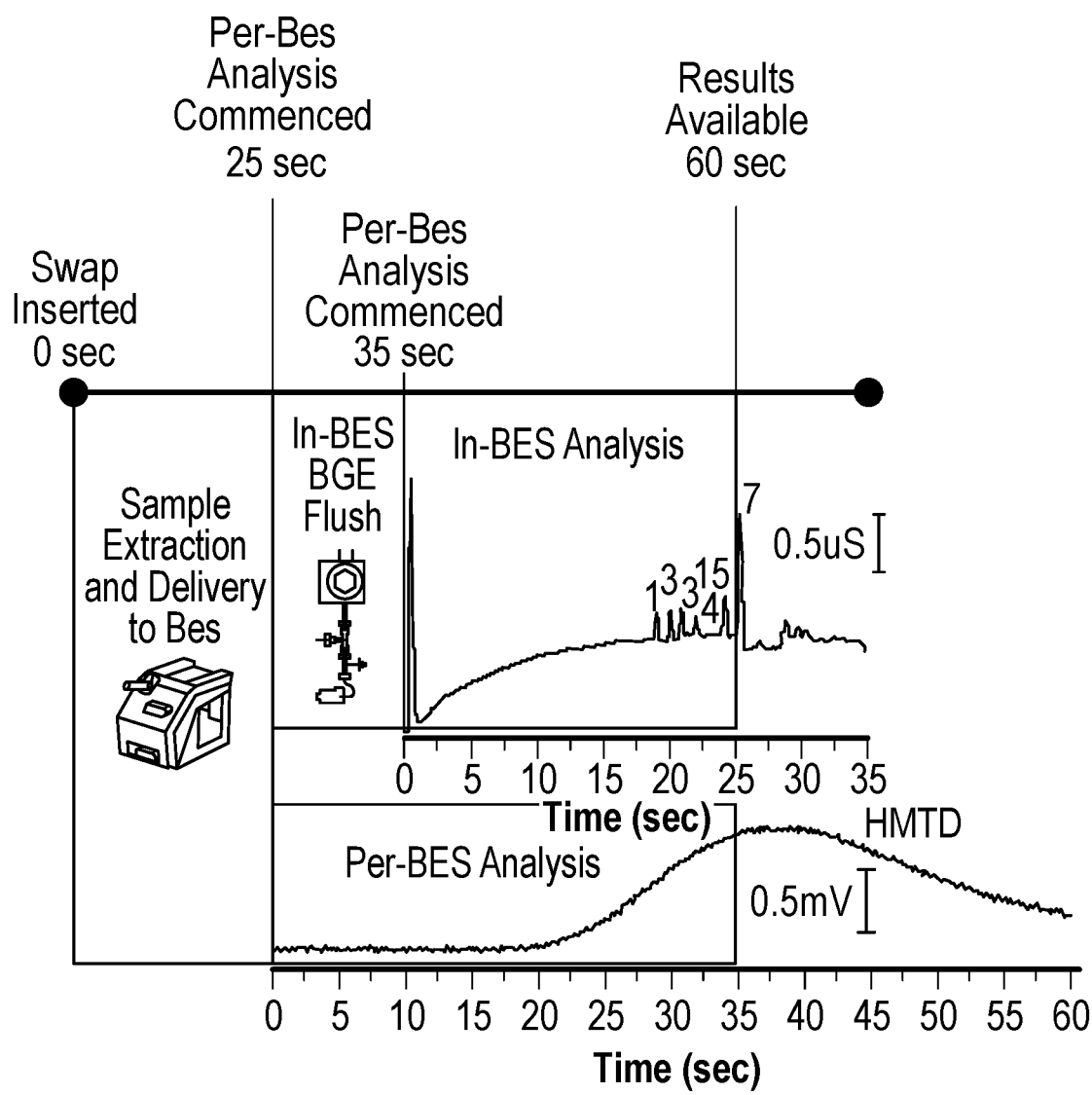
FIG. 51 is a schematic diagram showing the full analysis timeframe for the Scantex system. Conditions as in Table 1. Sample: Wet swab of stainless steel plate with 5 µL of 100 ppm standard applied and allowed to dry.

Parameters for the Scantex system are shown in Table 1 with the resulting analysis timeline and results shown in FIG. 51. Full analysis of a swabbed sample is completed in less than 60 seconds with 25 seconds taken by the FES to extract the swab and deliver the resultant sample to the In-BES. An additional 10 seconds is then required by the In-BES to flush the sample solution from the CE T-piece prior to analysis. Full analysis by the In-BES is completed within 25 seconds, that being the time taken for the internal standard (methansulfonate) to migrate through the CE system. The analysis timeline shown in FIG. 51 provides rapid swab-based screening of inorganic IED residues in under 60 seconds.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for the separation and detection of nitrate, perchlorate, azide, chloride and chlorate anions in a sample using electrophoresis, the method comprising a sample processing sequence which comprises:

introducing a sample and a background electrolyte comprising polyethyleneimine into a fused silica capillary separation channel having an internal diameter of from 20 μm to 30 μm, coated with alternating layers of a cationic polymer and an anionic polymer, wherein a first layer and a final layer of the fused silica capillary separation channel coating are cationic polymer layers, wherein the alternating layers consist of two cationic polymer layers and one anionic polymer layer;

applying a voltage potential across the fused silica capillary separation channel to effect a separation of the nitrate, perchlorate, azide, chloride and chlorate anions, wherein the voltage potential provides a field strength of between 1.0 kV/cm and 3.3 kV/cm of capillary across which the voltage potential is applied; and detecting the presence of the separated nitrate, perchlorate, azide and chloride anions, wherein the cationic polymer forming the two cationic polymer layers is a hexadimethrine polymer, and the anionic polymer forming the anionic polymer layers is a polystyrenesulfonate polymer.

2. The method of claim 1, comprising locating a cartridge comprising the fused silica capillary separation channel into a position so as to allow the sample processing sequence to be conducted, prior to conducting the sample processing sequence.

3. The method of claim 2, comprising performing said sample processing sequence multiple times with said cartridge in place prior to replacing said cartridge with a replacement cartridge.

4. The method of claim 3, comprising replacing said cartridge with the replacement cartridge after performing not less than 1000 sample processing sequences with said cartridge.

5. The method of claim 1, comprising locating a cartridge comprising the fused silica capillary separation channel and a background electrolyte reservoir into a position so as to allow the sample processing sequence to be conducted, prior to conducting the sample processing sequence.

6. The method of claim 1, wherein the cationic polymer forming the two cationic polymer layers is hexadimethrine bromide, and the anionic polymer is poly(sodium 4-styrenesulfonate).

7. The method of claim 1, wherein the concentration of polyethyleneimine in the background electrolyte is between about 0.03 and 0.08% by weight.

8. The method of claim 7, wherein the concentration of polyethyleneimine in the background electrolyte is about 0.06% by weight.

9. The method of claim 1, wherein the field strength is between 1.0 kV/cm and 1.6 kV/cm of capillary across which the voltage potential is applied.

10. The method of claim 1, wherein the field strength is between 1.0 kV/cm and 2.0 kV/cm of capillary across which the voltage potential is applied.

* * * * *